United States Patent
Schreib et al.

(10) Patent No.: US 10,791,445 B1
(45) Date of Patent: Sep. 29, 2020

(54) SYSTEM AND METHOD FOR MEASURING WAVE CHARACTERISTICS ON A BODY OF WATER

(71) Applicant: AECOM, Los Angeles, CA (US)

(72) Inventors: Benjamin Schreib, Baltimore, MD (US); Michael House, Laurel, MD (US); Samuel McClintock, Williamsburg, VA (US); David Rein, Ann Arbor, MI (US); Navid Yazdi, Ann Arbor, MI (US)

(73) Assignee: AECOM, Los Angeles, CA (US)

( * ) Notice: Subject to any disclaimer, the term of this patent is extended or adjusted under 35 U.S.C. 154(b) by 55 days.

(21) Appl. No.: 16/125,354

(22) Filed: Sep. 7, 2018

Related U.S. Application Data

(63) Continuation-in-part of application No. PCT/US2017/048236, filed on Aug. 23, 2017.
(Continued)

(51) Int. Cl.
*H04W 4/70* (2018.01)
*G06K 19/07* (2006.01)
(Continued)

(52) U.S. Cl.
CPC .......... *H04W 4/70* (2018.02); *G06K 7/10366* (2013.01); *G06K 19/0717* (2013.01); *G06K 19/0723* (2013.01); *H04W 84/18* (2013.01)

(58) Field of Classification Search
CPC .... H04W 4/70; H04W 84/18; G06K 19/0723; G06K 19/0717; G06K 7/10366;
(Continued)

(56) References Cited

U.S. PATENT DOCUMENTS

2012/0253566 A1* 10/2012 Ballou .................... G08G 3/02
701/21
2013/0063300 A1    3/2013 O'regan et al.
(Continued)

FOREIGN PATENT DOCUMENTS

EP        0 748 080 A1    12/1996

OTHER PUBLICATIONS

International Preliminary Report on Patentability for International Application No. PCT/US2017/048236 dated Mar. 14, 2019, in 8 pages.
(Continued)

*Primary Examiner* — Paul H Masur
*Assistant Examiner* — Michael K Phillips
(74) *Attorney, Agent, or Firm* — Knobbe, Martens, Olson & Bear, LLP

(57) ABSTRACT

A system for providing environmental wave data from floating buoys and equipment is based on the GRID tag system, which includes Geo-Referencing Identification (GRID) tag, GRID satellite (GRIDSAT) tag and associated cloud infrastructure and user interface meet the objectives of a robust global tagging and tracking system. The wave characterization module (WCM) system adds wave detection and computation to the GRID tag system. The WCM tag can be used to identify and track floating equipment while also providing local wave characteristics while communicating with other tags via mesh radio. The WCM-sat tag includes a satellite modem, global positioning system (GPS) receiver, and mesh radio to send wave and location data to a remote user. A WCM buoy includes the WCM-sat equipment in a free-floating buoy to report remote oceanic conditions.

21 Claims, 10 Drawing Sheets

Related U.S. Application Data

(60) Provisional application No. 62/382,112, filed on Aug. 31, 2016.

(51) Int. Cl.
*G06K 7/10* (2006.01)
*H04W 84/18* (2009.01)

(58) Field of Classification Search
CPC ...... Y02E 10/38; G01V 1/38; H04Q 2209/25; H04Q 2209/40
See application file for complete search history.

(56) References Cited

U.S. PATENT DOCUMENTS

| | | | | |
|---|---|---|---|---|
| 2015/0185007 A1* | 7/2015 | Deshetler Brinton | ...................... | G01C 13/002 702/2 |
| 2015/0346726 A1* | 12/2015 | Davoodi | ................. | B63B 22/24 701/21 |
| 2019/0226898 A1* | 7/2019 | Gray, Jr. | ................. | H04W 4/90 |

OTHER PUBLICATIONS

International Search Report Issued in International Application No. PCT/US2017/048236 dated Dec. 15, 2017 in 2 pages.

* cited by examiner

SYSTEM AND METHOD FOR MEASURING WAVE CHARACTERISTICS ON A BODY OF WATER

CROSS-REFERENCE TO PRIOR APPLICATIONS

The present application is a continuation-in-part of PCT/US2017/048236, filed 23 Aug. 2017, designating the United States which is based on, and claims the priority and benefit of, U.S. Provisional Patent Application No. 62/382,112, filed 31 Aug. 2016.

U.S. GOVERNMENT SUPPORT

This invention was made pursuant to Contract Number E16PC00015 with The Bureau of Safety and Environmental Enforcement, Department of the Interior of the United States government and the government may retain certain rights in the invention.

BACKGROUND OF THE INVENTION

Area of the Art

The present invention is related to measurement of local wave characteristics and is specifically directed to an advanced Radio Frequency Identification (RFID) tag-based system for water wave tracking and measurement.

DESCRIPTION OF THE BACKGROUND

Managing "assets" is an increasingly complex task of modern governments and corporations. Generally, asset management implies a semi-automated process of caring for valuable or important items. For example, a company could track all of the components used in a large manufacturing facility, verify that everything is working properly, and plan for upgrade and replacement of said components. To some extent, asset management can be applied to virtually any project. It turns out that managing assets for response to remote emergencies is particularly challenging.

Take, for instance, emergency response to an oil well spill or blowout; an oil well mishap is not guaranteed, but is certainly a possibility of petroleum exploration and production. An uncontrolled spill or well blowout can be a major environmental disaster—particularly since drilling often occurs in remote and environmentally sensitive regions. Therefore, particularly for remote locations, spill responses must be organized and set up in advance. However, the precise equipment needed for an emergency response depends on the location and geographical characteristics of a well site. Responding to an underwater well leak (e.g., as in the Gulf of Mexico) is quite different from controlling a runaway well in the Arctic. Thus, specialized equipment must be organized and shipped to an appropriate location in reasonable proximity to the well site. Making certain that the correct equipment is placed in the correct location is therefore an important extension of asset management; this consideration applies to response equipment for fire, earthquake, flood, conflict or any other emergency situation.

Until now, managers have been forced to depend on the original requisition and shipment records. If the remote location was constantly manned or reasonably accessible, personnel could be sent out to verify the existence of correct pieces of equipment at the remote site. If the site was essentially inaccessible, management may have had simply to hope that the original shipment records were correct. Furthermore, with remote locations, there is a significant possibility that one or more of the emergency components may be purloined. Therefore, a means to verify the presence of various assets in remote locations is required. It is also advantageous if any movement of the assets were automatically reported to management. Currently, there have hitherto been no systems available for carrying out, either automatically or semi-automatically, the tasks of asset verification and/or movement reporting, wherein the assets are in remote locations.

In light of the advantage of automatically reporting asset movement, it is further appreciated that a system capable of automatically reporting movement may also be capable of automatically reporting on the causes of movement. Illustratively, if a system is attached to an object floating on a body of water, the system may measure wave characteristics on the body of water, such as height, length, and period and either (1) convey such information to local responders in real-time via a wireless communication protocol (such as Wi-Fi or Bluetooth) and/or (2) engage in remote reporting through a satellite network.

Wave characteristic and other automatically collected and reported information can be used for many purposes, including inter alia (1) enhancing the situational awareness of emergency response crews during, e.g., a storm or tsunami, thus enabling them to best use their time to prepare a response; and (2) optimizing the ability of these crews to effectively and efficiently use available resources during the response. Illustratively, emergency response crews may have an extensive inventory of different types of mechanical oil skimmers. During a storm or tsunami, these crews may use system-collected data, such as information pertaining to wave characteristics and other metrological data, as well as combinations of the aforesaid information, to inform their use of particular skimmers at different physical ocean locations.

SUMMARY OF THE INVENTION

The current invention provides a system that can be used to tag and track assets anywhere in the world and under any environmental condition to increase a user's situational awareness of equipment, assets, and resources before, during, and after their deployment. The system comprises of Geo-Referencing Identification (GRID) tag(s), GRID satellite (GRIDSAT) tag(s) that have been modified to include wave detection and enumeration systems, and associated cloud infrastructure and user interface to meet the objectives of a robust global tagging and tracking system.

In one embodiment of the invention, a holistic "GRID" system is used to track material movement, storage, and deployment consists of several distinct parts:

1. The GRID tag used to identify unique pieces of equipment or storage containers for low-value or aggregate equipment. The GRID tag resembles traditional RFID tags except that the tags are able to communicate with each other. GRID tags only communicate with each other using a mesh radio system in each tag. However, they can also communicate with a GRIDSAT tag and thereby to a satellite system, through the satellite gateway and on to the cloud infrastructure for processing and display to the end User.

2. The GRIDSAT tag, which can be used by itself for high-value items, large shipping containers, or vehicles and vessels to track and locate them, or used in concert with GRID tags that communicate with each other and with the GRIDSAT tag by means of mesh radio. The GRIDSAT tag consists of a satellite modem, global positioning system (GPS) receiver, and mesh radio. It will be appreciated that GRID and GRIDSAT tags may also be equipped with Wifi and/or Bluetooth modules for direct, real time communication with a local user (via, e.g., a mobile device such as a tablet, laptop computer or a smart phone).

3. The satellite system that the GRIDSAT tag communicates through, by default because of extreme latitudes for some of the target locations, is the Iridium system. The Iridium network is not described in this application, but is referred to often. It will be appreciated that other satellite systems can be substituted depending on the locations, etc. that the GRIDSAT will be used in.

4. The GRID server and database, which includes all pieces of the cloud Infrastructure and GIS (Geographic Information System) software, including a database to store all applicable tracking data, and a user interface for extracting and analyzing the information. It will be appreciated that a local user interface (for, e.g., tablet and smartphone users) may also be created to assist, e.g., local responders, in obtaining, viewing, and analyzing real time data.

The GRID and GRIDSAT tags provide the end-users with an active radio frequency identification (RFID) system that:

1. Can be deployed to track any emergency response vehicle or asset anywhere in the world.

2. Does not require setting up field infrastructure, including any local network, power lines or local RFID portal to read the tags. Unlike typical RFID systems, the GRID/GRIDSAT system can operate autonomously over a wide-area while fully untethered.

3. Utilizes a self-healing mesh network that can alter the pathway for tag communications to other GRID and GRIDSAT tags.

4. Is powered, but remains in a low power "sleep" state until "awoken" by a sensor driven event (such as accelerometer output) and/or a software schedule.

5. Utilizes the open-source IPv6 such as Low Power Wireless Personal Area Network (6LoWPAN) wireless technology, providing flexibility in future end-user configurations and use cases.

A trade study and COTS (commercial, off the shelf) assessment of available satellite communication services and satellite-tracking providers was performed early in the inventive process for tags that were predominantly designed for asset tracking. The items, components, services, and software targeted in the study were the primary components of RFID systems necessary for positioning and communicating through satellite systems: radio frequency modules; GPS modules; antennas; accelerometers; microcontrollers; combinations of multiple devices, such as Inertial Measurement Units (IMUs), which are comprised of a 3-axis accelerometer, a 3-axis gyroscope, a memory unit, and a basic processor; batteries, and support infrastructure. All internal components can operate in marine arctic environments such that the tag is saltwater-resistant and corrosion-resistant, and be able to function down to at least minus 40° Celsius.

A primary operational focus of the GRID tags is on deployed resources, such as vessels arriving to assist in a spill or for another disaster response. The tagging and monitoring of pre-positioned assets, such as oil response equipment, in storage and in transit is a secondary focus. Another key area of focus pertains to monitoring natural phenomena, such as ocean waves, which can affect the movement of assets and people (such as responders to an oil spill) and are important for weather and hazard (e.g., tsunami) warning systems.

The inventive system can be readily modified for various remote tracking tasks. The embodiment that is described in detail below has two main environmental sensor inputs to the controller for all tags; namely, a voltage input for verifying battery status and a motion sensor (accelerometer, gyroscope or similar device). In addition, the GRID and GRIDSAT tags have GPS receivers and antennae, which report GPS location data.

Any of a number of additional sensors can be provided to extend the usefulness of the system. Illustratively, various sensors that contribute to the gathering, processing, and transmission of localized metrological data may be added to provide actionable intelligence to local and remote stakeholders. For example, temperature sensors can allow the system to respond automatically to changes in the local environment. Moreover, anemometers, which measure and detect wind speed and direction, may also be added. Apart from radio systems, other types of electromagnetic energy sensors can be added so that the system can respond to changes in illumination (e.g., x-ray and gamma ray levels). Also, radiation sensors can allow the system to respond to particulate radiation (e.g., alpha or beta radiation).

Indeed, GRID and/or GRIDSAT tags can be modified with sundry sensors and equipment to enable various unique capabilities. These modified tags can be combined to form systems that may serve very specialized purposes. Illustratively, modified GRID and GRIDSAT tags utilizing inter alia sonic transducers can be used to create a system that tracks ice floes and icebergs. In particular, a modified GRID tag, known as the Underwater Identification (UWID) tag, is comprised of GRID tag components sealed within a waterproof spherical shell. UWID tags are emplaced in the underside of (or within), e.g., an ice floe by a submersible or similar device. In these UWID tags, (1) the accelerometer is replaced by a pressure sensor that allows the device to respond to depth changes and (2) the mesh radio is replaced by a subsurface transducer and a Lamb/Rayleigh Wave transducer. Moreover, a modified GRIDSAT tag, known as the Lamb-Wave Geo-Referencing Identification (LDGRIDSAT) tag, uses an accelerometer and onboard processing of the accelerometer-recorded data to detect specific signals being transmitted through the ice in the form of guided acoustic waves, of which there are many different types, such as lamb waves and Rayleigh waves, which move vertically from underneath the ice to above the ice. These are generalized as "guided waves" which are mechanical stress waves, which are generated by an acoustic transducer in this instance but theoretically could be generated by any mechanical force such as a hammer or dynamite.

LDGRIDSAT tags have a Lamb/Rayleigh detector/transducer in place of the mesh radio and are emplaced on the top of, e.g., an ice floe, and can be designed for emplacement by airdrop. These LDGRIDSAT tags can transmit a sonic "ping" into the ice; the UWID tag then detects this "ping" through its subsurface transducer and responds by outputting "guided waves" (Lamb waves and Rayleigh waves), which encode data and may be detected through the ice by the LDGRIDSAT tag at distances of less than 100 ft. through about 3300 ft. (less than 30.5 m through 1000 m). For ice/water transmission, the mesh radio may be omitted because it is of limited utility under these conditions. This sonic system allows LDGRIDSAT tags to (1) locate any UWID tags associated with, e.g., local ice floe and (2) transmit the identities of these UWID tags, along with the LDGRIDSAT tags' own locations and identities, to a remote user by means of satellite. Movement of the ice floe is constantly recorded and the user is kept appraised of the geographical location of the ice. In addition, pressure changes in the UWID tags are reported, as well as the presence of the UWID tags. Changes in the locations of UWID tags can signal breakup of the ice floe.

Accelerometers and gyroscopes can be particularly useful in a system for measuring wave characteristics, such as height, length, and period. Special GRID and GRIDSAT tags have been developed for this purpose. In particular, a modified GRID tag known as a wave characterization module (WCM) is equipped with (1) an inertial measurement tool (IMU) containing an accelerometer and a gyroscope and (2) an associated microcontroller unit (MCU). The MCU associated with the IMU (the Sensor MCU) is additional to the MCU present on all GRID tags that coordinates the activity of each hardware component (Device MCU). The Device MCU packages and directs where data processed by the Sensor MCU are sent. In addition, WCMs, like all GRID tags, contain GPS systems for accurate time keeping and location tracking as well as radio frequency (RF) modules for local mesh communications from device to device. Moreover, each WCM has a Wifi Module that locally delivers wave characterization data from both the WCM itself and other devices with whom the WCM communicates via mesh radio. WCMs can be attached to equipment, such as oil skimmers, booms, buoys, and vessels. WCM-Sats are WCMs with satellite transmitters and antennae; WCM-Sats can be attached to high-value assets, such as vessels, for remote reporting of location information, status, and wave conditions through the global satellite network.

Finally, WCM-Buoys have equipment identical to WCM-Sats', but WCM-Buoys are intended to be free-floating and stay on station for an extended period reporting wave conditions. WCMs and WCM-Sats are enclosed in thick-walled polycarbonate plastic with pressurized screws for ingress protection 67 (IP67) sealing, which provides protection from immersion in water. WCM-Buoys are constructed of polypropylene, painted to be resistant to ocean environments, and can withstand being dropped without damage to the case material; the satellite, Wifi, and GPS antennas are epoxied (with marine-grade epoxy) into a recessed lid compartment. To calculate the wave characterization information sent to a user, a WCM's IMU reports the acceleration and angular velocity at a given sampling rate from the 3-axis accelerometer and gyroscope; the resulting data may be used to calculate the total heave of a body of water, the wave frequency, and other wave characteristics, such as wave height.

Whereas the 3-axis accelerometer measures acceleration (e.g., in meters/second$^2$), the 3-axis gyroscope measures angular velocity (e.g., in degrees/second). Accelerometer data may be utilized to determine, via a scalar approach, the total displacement in a single combined direction (put differently, data pertaining to the three axes are combined to determine displacement). The benefit of this scalar approach is that it enables users to calculate displacement from WCM data without concerning themselves with orientation; that is, the scalar approach enables the WCM device to function independent of orientation. Testing has confirmed that this scalar approach works very well for the large majority of cases. However, when there is, e.g., large lateral movement of a WCM (or other device) by a wave, the scalar approach may overestimate the heave displacement because there is a large sideways movement vis-a-vis the up and down movement (i.e., the heave). This problem can be corrected by using a combination of the accelerometer and gyroscope data and knowing the orientation of the WCM device when placed on a piece of equipment (essentially a calibration step prior to deployment and measurement). Thus, a gyroscope may be used to improve measurement accuracy by identifying or helping to track changes in WCM orientation; put differently, gyroscope data may be used to help accommodate edge cases where the scalar approach alone loses accuracy due to the effects of, e.g., large lateral movements.

DETAILED DESCRIPTION OF THE INVENTION

Figure 1:
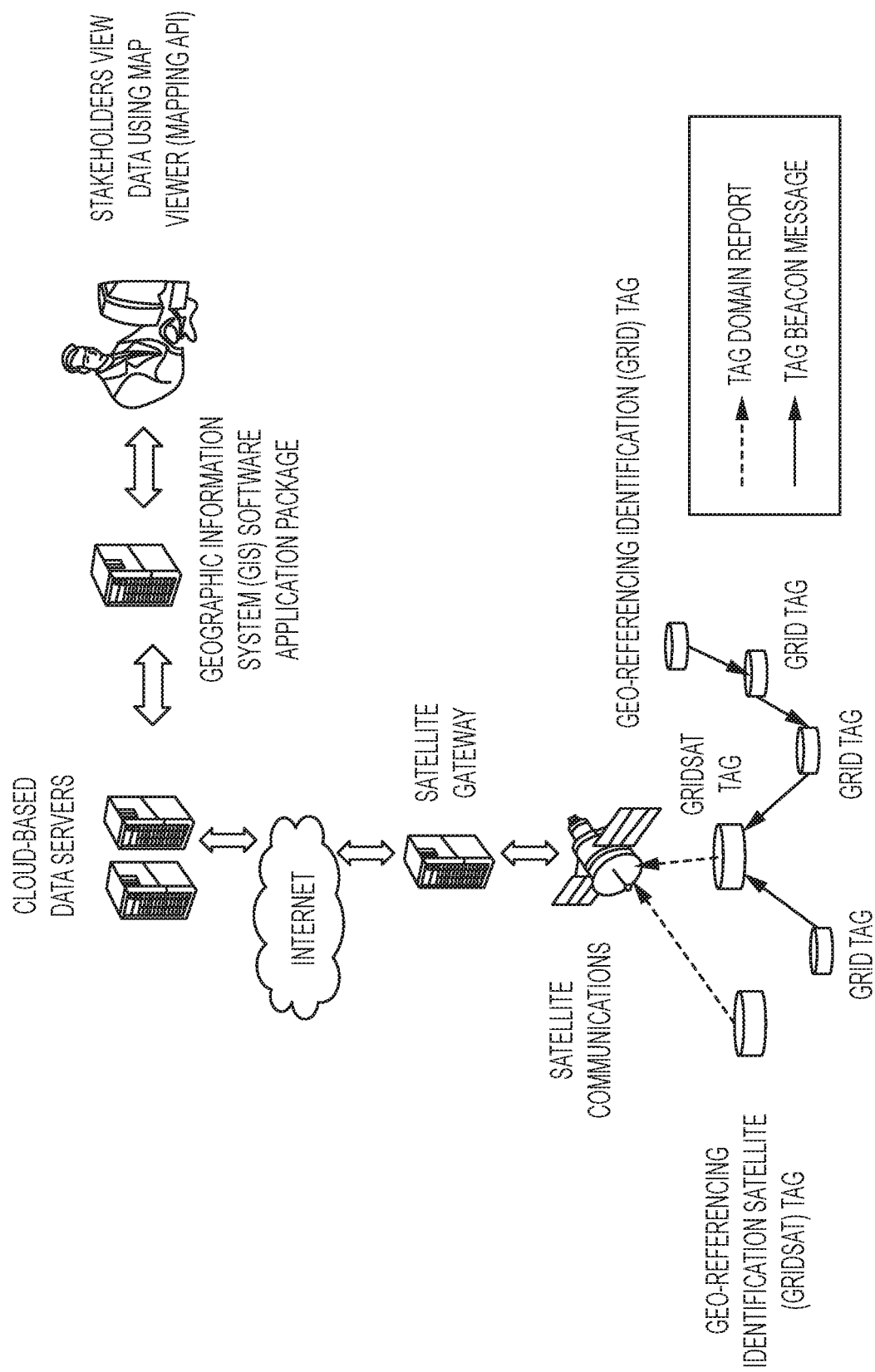
FIG. 1 is a diagram of the various components and how they communicate.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an RFID system for quantifying local wave characteristics.

Quality Function Deployment (QFD) is a structured approach to defining customer needs or requirements and translating them into specific plans to produce products to meet those needs. In the case of the GRID and GRIDSAT tags, the initial requirements were both specific and derived from subsequent tests:

Small;

Inexpensive;

Automatically inventory all response equipment in real time;

Indicate location during storage and deployment;

Maximize the use of commercial-off-the-shelf (COTS) parts;

Compatible with the marine environment;

Satellite communications for global coverage;

Vibration power generator for increased functionality during equipment deployment;

Real time updating of inventory database;

Wireless Network→Mesh network for robustness (link healing);

Range (mesh): 100-500 feet;

Battery Life 6 months-2+ years (power management);

Temperature range: −40° C. to 85° C.;

Military standard 883 specifications for vibration and shock (durability); and

IP67 packaging specifications (water resistance and durability).

The present invention supports inventory, transit, staging, deployment, and response. Equipment and assets can be identified and tagged while in storage so that the user knows which assets are available and where. The GRID and GRID-SAT tag's low power storage mode allows intelligent power management, with timely communication. If an incident occurs that requires a response, the user can track assets as they are moved from inventory to a forward staging area. Through the mesh network, GRID tags can communicate through other GRID tags to a GRIDSAT tag, which then relays the entire message through the satellite communication network with location, time, identification, and status information to the mapping user interface or common operating picture. At the staging area, resources can be assigned and deployed into action. Once equipment, personnel, and other resources are deployed into the field during a response, the system automatically reports their information and location for ease of use to enhance situational awareness. Low power consumption enables tagging of equipment while in storage to allow for the identification and inventory of available resources. Resources at a staging area can be assigned and deployed to any user. GRID tags form a local mesh network and message to a GRIDSAT tag that automatically reports resource information to a remote management center for identification and tracking during a response. GRID and GRIDSAT tags, including WCMs, WCM-Sats, and WCM-Buoys can also communicate with local personnel mobile devices via Wifi and/or Bluetooth; i.e., any of these tags can automatically report its data and the data from other tags (nodes) in the mesh network to a user interface of a local mobile device, such as a tablet or smart phone.

FIG. 1 shows how the various components interact to form a complete system. GRID tags 10 are deployed on various pieces of equipment and containers of supplies. As detailed below, the individual GRID tags use low power mesh radio to send data (Tag beacon message 12) to communicate with nearby GRID tags 10. GRID tags 10 can also communicate by mesh radio with a GRIDSAT tag 14. The GRIDSAT tag 14 is used to tag key pieces of equipment. Not only can the GRIDSAT tag 14 receive messages from GRID tags 10, it has a GPS receiver allowing it to determine its geographical location. It can then transmit (Tag Domain Report 16) its location as well as information received from the GRID tags 10 by means of a satellite modem and antenna to a communication satellite 18. This information is passed through a Satellite Gateway 20 to the Internet 22 and on to cloud-based servers 24 where GIS software 26 can provide a stakeholder user 28 with various graphical representations of the precise locations of the various tagged assets. This should be contrasted to a typical RFID system, where active or passive tags transmit their identities to a nearby reader. In the inventive system, the GRID tags 10 communicate to nearby GRID tags 10 creating a mesh network from which the identities of all the Tag members can be determined. The mesh network includes any nearby GRIDSAT tags 14 that add GPS location information to the network information and transmit, to a remote user 28, the GPS information as well as the identities of all tags.

The messages that can be passed between the GRID tags to the GRIDSAT tags and on to the satellite gateway are summarized as:

GRID tag Message Format to GRIDSAT tag: A payload of User Datagram Protocol (UDP) packets are sent over the tag mesh network. UDP packet format and mesh protocol have routing and cyclic redundancy check fields, and are not duplicated in payload fields. Most communications on the mesh network are these tag beacon messages.

GRIDSAT Message Format to cloud Infrastructure: The GRID tag beacon messages are aggregated along with the GRIDSAT tag message and sent from the GRIDSAT tag to the server over the Iridium satellite network to the cloud infrastructure for interpretation and further processing for final display on the mapping user interface.

Multi-Block Packet Header: When a GRIDSAT message is larger than the Iridium's Short Burst Data (SBD) message payload of 340 bytes, the GRIDSAT sends the message in multiple SBD packets. Each packet has a 3-byte block header followed by up to 337 bytes of the message. WCM and WCM-Sat messages include parts of the GRID and GRIDSAT messages, such as tag ID and GPS coordinates, but include additional information, such as wave height, length, and period.

Figure 2:
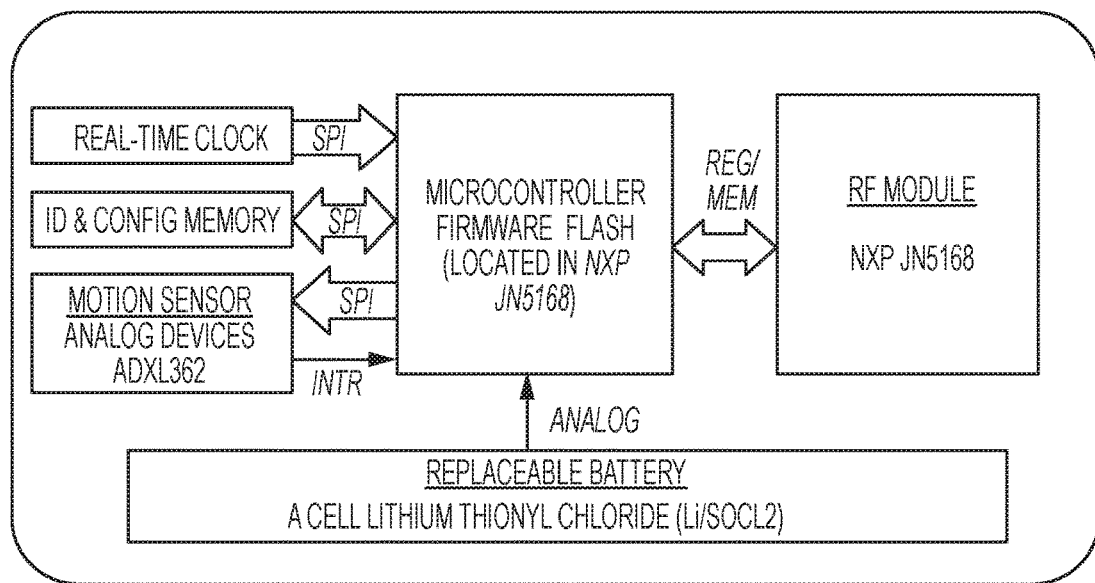
FIG. 2 is a block diagram of the internal components of the GRID tag.

FIG. 2 shows a GRID tag architecture block diagram. The design includes a battery 30 as a power supply, a Micro Control Unit (MCU) 32 and Radio Frequency (RF) module 34 operating at 2.4 gigahertz and implementing 802.15.4, 6LoWPAN, with enhanced functionality. The firmware was developed to improve power management and mesh network communication. The tag also includes a motion sensor (accelerometer) 36 that informs the MCU whenever the tag has been moved. Memory 38 and a real time clock 40 complete the components.

The GRID tag 10 uses the RF module 34 for all processing functions. The RF module 34 provides a multi-tasking environment that supports both a 6LoWPAN mesh network stack and application-specific tasks implementing GRID tag functions.

The network stack is configured as a router node, allowing the GRID tag 10 to communicate on the network and route messages between other nodes and the GRIDSAT tag 14. The GRID tags 10 use network discovery to identify the strongest router signal and the closest GRIDSAT tag 14 to decide which network to join. The network is self-healing: when a GRID tag 10 loses contact with its router to the GRIDSAT tag 14, it returns to discovery mode to find a new router or new network to join.

Table 1 (below) shows the internal sensors that will produce the signals needed for tag operation and power management.

| Sensor | Interface | Notes |
| --- | --- | --- |
| Motion | Serial Peripheral Interface (SPI) INTR digital motion detect signal | The accelerometer operates in low power motion detection mode. It asserts INTR to interrupt and wake the RF module. It uses the motion wake-up to control switching from Low Power Storage mode to Active mode. |
| Battery | Analog to Digital Converter | The MCU module computes the battery voltage, compares it to a |

| Sensor | Interface | Notes |
| --- | --- | --- |
| | | low threshold to detect low voltage, and sets a fault status. |

Firmware. The following functions were implemented in the tag firmware to enable mesh networking and the advanced battery power management required to meet the desired GRID tag functionality and performance.
- Network stack functions
  ⇒ 802.15.4 Media Access Control (MAC) layer
  ▶ Network joining
  ▶ Point-to-point communications
  ▶ Protocols (UDP, Internet Protocol [IP], Internet Control Message Protocol [ICMP])
  ⇒ 6LoWPAN layer configured as a router
  ▶ Maintain routing tables and neighbor lists
  ▶ Route unicast messages through network
  ▶ Rebroadcast broadcast and multicast messages
- GRID tag functions
  ⇒ Initialize and configure network stack
  ⇒ Initialize GRID tag functions
  ⇒ In deployed (active) state
  ▶ Periodically send GRID tag report to GRIDSAT tag (if joined to a network)
  ▶ Read battery voltage
  ▶ Process parameter, get and set messages from maintenance network
  ▶ A switch to the storage state will be determined by the amount of time no motion is detected
  ⇒ In storage state
  ▶ Periodically send beacon message
  ▶ Time motion-detected signals to determine when to switch to deployed (active) state.

Figure 5:
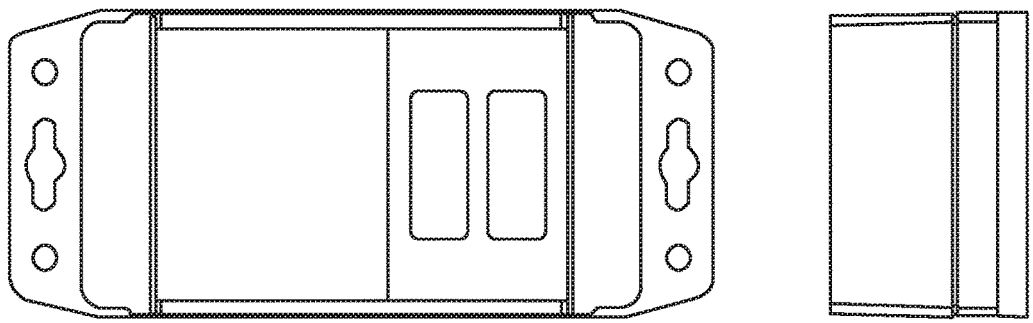
FIG. 5 shows dimensional drawings of the GRID tag enclosure with FIG. 5A showing the enclosure from above and FIG. 5B showing the enclosure from one end.

Enclosure FIG. 5 shows diagrams of the enclosure which is constructed of thick-walled polycarbonate plastic with elastomer and pressurized screws to provide IP67 (Ingress Protection) sealing. The enclosure can be coated by conformal deposition of a hydrophobic material including Parylene C or a dedicated antenna hydrophobic position locator pad. FIG. 5A shows the enclosure from above while FIG. 5B shows the container from the end. In FIG. 5A, the length L is 5.92 in. (150.4 mm); in FIG. 5B, the height H is 1.65 in. (41.9 mm) while the width W is 2.59 in. (65.79 mm).

Figure 9:
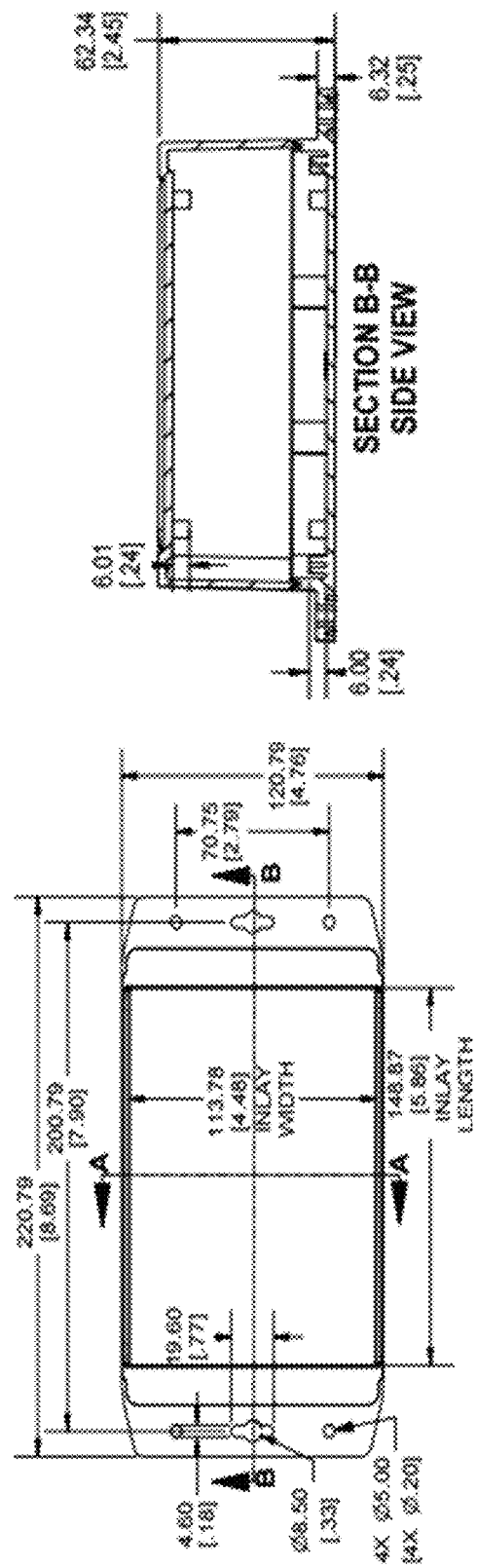
FIG. 9 is comprised of dimensional drawings of WCM and WCM-Sat enclosure dimensions in millimeters (inches).

It is appreciated that, as depicted in FIG. 9, WCM enclosures are slightly larger than the enclosure depicted in FIG. 5. Moreover, while WCM and WCM-Sat devices include, like GRID and GRIDSAT tags, internal antennas, WCM and WCM-Sat devices may also be configured to include external external antennas. These antennas, both internal and external, are for GPS, Satellite, Mesh Network (RF 6lowpan), and local wireless network (WiFi or Bluetooth) communication.

Figure 3:
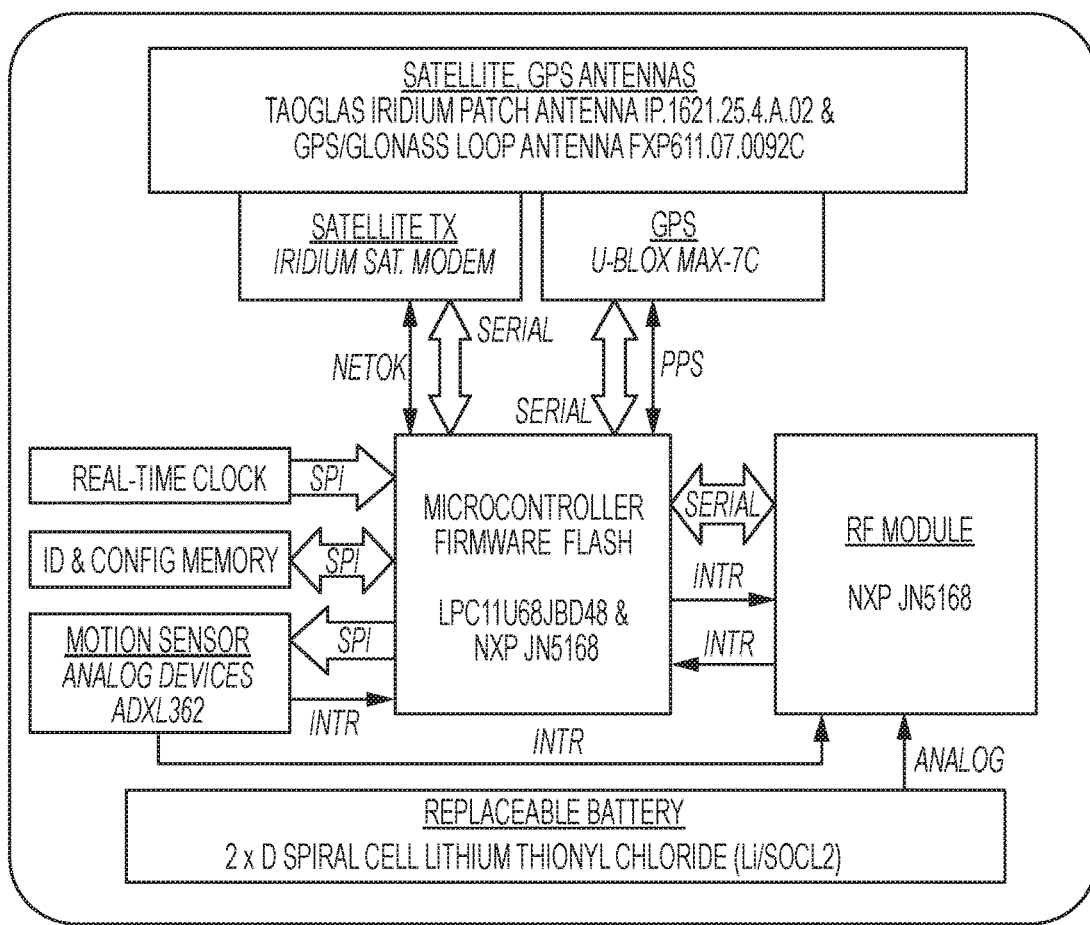
FIG. 3 is a block diagram of the internal components of the GRIDSAT tag.

FIG. 3 shows a GRIDSAT tag 14 architecture block diagram. The hardware includes the MCU 32, RF module 34, and high capacity batteries 31. Additionally, the hardware includes a satellite modem 42 and a GPS module 44 as well as a satellite-GPS antenna 46. The firmware was developed to provide improved power management and mesh network communication.

The GRIDSAT tag architecture includes an MCU 32 to act as a border router host, providing the gateway between external communications and the mesh network GRID tags 10. It directly interfaces with the GRIDSAT tag sensors, GPS module 44, Iridium modem 42, and RF module 34. It is appreciated that the component architectures of GRID/GRIDSAT and WCM/WCM-Sat devices differ. Vis-à-vis the GRID/GRIDSAT devices, WCM/WCM-Sat devices contain additional components, such as IMUs, sensor microprocessors, and local wireless chipsets (WiFi or Bluetooth). See FIG. 8.

Reference: Figure

The RF module 34 is the same one used for the GRID tags 10, but runs different firmware. The RF module 34 functions as the border router node (coordinator), maintaining lists of joined tags, and sending network beacons to synchronize mesh communications. It interfaces with the MCU 32 over an asynchronous serial interface, and has a digital output interrupt signal (INTR) to wake the MCU 32 whenever the RF module 34 needs to communicate with the MCU 32. The MCU 32 has sensor inputs for battery voltage and the accelerometer and directly interfaces with them and the GPS module. Parameters define polling rates for each sensor and the calibration/conversion coefficients. The firmware of GRID/GRIDSAT and WCM/WCM-Sat devices differ in minor ways because (1) the message formats that need to be packaged and transmitted are slightly different (i.e., WCM/WCM-Sat device messages include inter alia wave height, length, and period information); (2) the WCM/WCM-Sat device firmware needs to coordinate power on/off as well as data connection and transmission via the local wireless module (as connected through Wi-Fi or Bluetooth).

Iridium Modem. The GRIDSAT tag 14 uses the Iridium 9603 modem module 42 for communications with the cloud server 24 and GIS interface 26 by periodically sending GRIDSAT Tag Domain Reports 16.

Firmware and Algorithms. Firmware on the GRIDSAT tag 14 was designed to implement the mesh networking communication, satellite communication, and power management. The MCU 32 sleeps most of the time, but wakes to process messages from the RF module 34 and for periodic server update cycles. The server update cycle is activated whenever the MCU 32 has gathered the information needed to create the GRIDSAT Tag Domain Report 16, including checking system status and waiting for a GPS fix. The following are key MCU functions:
- MCU handling of messages from the RF module:
  ⇒ Receives GRID tag reports—update information in GRID tag table
  ⇒ Receives join/drop notifications—update GRID tag table
  ⇒ Receives battery level—update GRIDSAT status
  ⇒ Receives motion detection—initiate timer to determine state change
- For each server update cycle, the MCU performs the following operations:
  ⇒ Powers on GPS and waits for a stable fix, then powers off GPS
  ⇒ Generates GRIDSAT report
  ⇒ Powers on Iridium modem
  ▶ Waits for satellite detection
  ▶ Connects to satellite and opens channel for communications
  ▶ Sends GRIDSAT report using SBD (Iridium Short Burst Data) protocol
  ▶ Waits for packet acknowledgment
  ▶ Powers down Iridium modem
  ⇒ Sleeps until the next server update cycle or message from RF module The RF module has the following functions:
- Network stack functions
  - 802.15.4 MAC layer
    - Network joining
    - Point-to-point communications
    - IP protocols (UDP, IP, ICMP)
    - Sends network announcements for network discovery
    - Sends network beacon polls to synchronize network communication windows
  - 6LoWPAN layer configured as a border router
    - Maintains routing tables and neighbor lists
    - Maintains table of all nodes joined to the network
- GRIDSAT functions
  - Initializes and configures network stack
  - Initializes GRIDSAT functions
  - In deployed (active) state:
    - Passes to MCU notifications of GRID tags joining the network
    - Passes to MCU notifications of GRID tags dropping from the network
    - Passes to MCU all UDP packets (GRID tag reports, etc.) received from network
    - Sends over network all UDP packets (parameter get/set, etc.) received from MCU
    - Processes command messages from MCU for GRIDSAT functions (read battery voltage, etc.)
    - Sends notifications to MCU of motion detection
  - In storage state
    - Periodically sends beacon message, otherwise radio is off
    - Sends notifications to MCU of motion detection
    - Periodically sends MCU reading of battery voltage Time Synchronization. The GRIDSAT tag 14 uses the GPS Coordinated Universal Time (UTC) time to set and maintain its real-time clock 40, which is GPS time plus the correction for leap seconds. It timestamps GRID tag 10 messages when received. It adds to sync beacons the current UTC time, which allows GRID tags 10 to maintain their real-time clock (RTC) 40. Therefore, network-wide RTC time is accurate to about one second.

Firmware Segment for Controlling Iridium Modem Module. The MCU 32 communicates with the Satellite Modem module 42 over an asynchronous serial interface. Data packets are sent as SBD messages to the Iridium system. The Iridium gateway 20 sends the messages to the cloud server 24 and GIS interface 26 as Mobile Originated (MO) direct IP transfers.

The payload for SBD messages is 340 bytes. This allows sending a GRIDSAT 14 message with 26 GRID tags 10 in a single packet. If a GRIDSAT network has more than 26 joined tags, then the GRIDSAT message is sent as a multi-block message.

Both the GRID tag 10 and the GRIDSAT tag 14 do not have an external on/off switch and will operate autonomously and automatically. Both the GRID tag 10 and the GRIDSAT tag 14 operate in three different modes: (1) Low Power Storage Mode (LPSM). This mode is designed for the tags to minimize power consumption during storage. Motion sensors are monitored during LPSM. Storage beacon messages may be sent for inventory purposes. (2) Active Mode. The tags operate during deployment in this mode. In this mode, the GRIDSAT tag 14 will act as a network-coordinator host to send sync beacons and manage GRID tags 10 in its network. The GRIDSAT tag 14 will also establish the satellite communication link and run a server update cycle with GPS fix. (3) Maintenance Mode. This mode can be initiated by issuing an addressed maintenance command message to a target tag. In this mode, the configuration parameters on the tag can be retrieved and set using command messages.

The following Table 2 (below) compares Low Power Storage operation modes of the GRID tag and the GRIDSAT tag:

|  | GRID Tag | GRIDSAT Tag |
| --- | --- | --- |
| Enter | When there is no motion detected for a configurable period of greater than 1 hour to greater than 1 week and the tag is not joined to a mesh network. | When there is no motion detected for a configurable period of greater than 1 hour to greater than 1 week and the tag is not joined to a mesh network. |
| Configured As | Low Power End Node | Low Power End Node |
| Network Status | No activity Powering down all of its subsystems except the Motion Sensor. | No activity Powering down all of its subsystems except the Motion Sensor. |
| Operation | The RF Module sets its sleep timer to the storage beacon period and monitors the Motion Sensor. The RF Module also sends an optional storage beacon message at a rate configurable from 1 per hour to 1 per month. | Before the GRIDSAT tag enters LPSM, it waits for the next sync beacon and sends a beacon with network shutdown indicator, so that all of the joined GRID tags will also be able to enter LPSM. The RF Module sets its sleep timer to the storage beacon period and monitors the Motion Sensor. The RF Module also sends an optional storage beacon message at a rate configurable from 1 per hour to 1 per month. |

The following Table 3 (below) compares Active operation modes of the GRID tag and the GRIDSAT tag:

|  | GRID Tag | GRIDSAT Tag |
| --- | --- | --- |
| Enter | Upon Exit of LPSM | Upon Exit of LPSM |
| Configured As | Network router. | A network coordinator host. |

-continued

|  | GRID Tag | GRIDSAT Tag |
|---|---|---|
| Discovery | When not joined to a network, running the tag's discovery process looking for an active network to join. | N/A |
| Sync Beacon | N/A | RF Module sends network sync beacons every 1-5 minutes |
| Operation | The tag sleeps between active windows and wakes to start an active window. During the active window, the tag has the following operations:<br>1. The network stack handles routing and resending of traffic.<br>2. The network stack listens for a sync beacon from its network router. When it gets the sync beacon, it responds with an ACK message;<br>3. Periodically the application level sends a GRID tag report message.<br>After the end of the active window, the tag listens for a maintenance command addressed to itself and enters Maintenance Mode if a maintenance command is received. | RF Module:<br>Maintains network tables of routes and joined GRID tags based on acknowledgement to beacon.<br>Sends notification to the MCU when a GRID tag joins or drops from the network.<br>Sends received GRID tag Report Messages to the MCU.<br>After the end of the active window, listens for a maintenance command addressed to itself and enters maintenance mode.<br>MCU:<br>Wakes 1-2 times per day to run a Server Update Cycle.<br>Handles notification and report message from the RF Module to maintain its GRID tag table.<br>Powers on GPS, waits for stable GPS fix (expected to be 20 to 500 seconds), then powers down.<br>Powers on Iridium modem, waits for a connection, sends a GRIDSAT and GRID tag report, powers down modem. Total on time expected to be 6 to 22 seconds.<br>Sleeps until next Server Update Cycle. |

The following Table 4 (below) compares Maintenance operation modes of the GRID tag and the GRIDSAT tag:

|  | GRID Tag | GRIDSAT Tag |
|---|---|---|
| Enter | After receiving an addressed maintenance command message. | After receiving an addressed maintenance command message. |
| Configured As | End Node | End Node |
| Network | Commanding maintenance network | Commanding maintenance network |
| Operation | Accept set and get parameter message to allow configuration of the GRID tag. | Accept set and get parameter message to allow configuration of the GRIDSAT tag. |
| Exit | Either by command or when it drops from the maintenance network. | Either by command or when it drops from the maintenance network. |

Firmware of the WCM, WCM-Sat, and WCM-Buoy ("WCM Devices") vis-a-vis that of the GRID/GRIDSAT devices discussed above have some differences. The most notable differences are the additions to the WCM Devices of (1) the Sensor MCU (which communicates with the IMU) and the (2) Local Wireless Module (Wi-Fi or Bluetooth). Again, WCM Device firmware will incorporate the ability for a user to configure the device in either gateway or node mode, which will define operation of the mesh networking communication and external reporting through the Local Wireless Module (e.g., Wi-Fi module) and satellite modem. WCM Device firmware implements the mesh networking communication protocol, power management functions, sensor MCU coordination, GPS fix, Wi-Fi, and satellite communications.

- Device MCU functions
    ⇒ The device MCU sleeps most of the time, but wakes to:
        ▸ Process messages from the mesh RF module
        ▸ Store sensor MCU readings
        ▸ Process periodic server update cycles
            • The server update cycle occurs when the Device MCU gathers the information needed to create the WCM gateway or node report messages, including -continued checking system status and waiting for a GPS fix.[1]
- Facilitate periodic local communication to devices such as an iPad.
  - Periodic local communication occurs when reports are transferred to any local device over, e.g., Wi-Fi to view wave characterization readings.
⇒ The protocol steps of the Device MCU are described below:
- Device MCU handles messages from the mesh RF module
  - Receives WCM node report messages ? updates information in the WCM table
  - Receives join / drop notifications ? updates WCM table
  - Receives battery level ? updates WCM status
- The sensing and signal processing software and firmware for wave characterization is programmed into the Sensor MCU. The Device MCU communicates with the Sensor MCU through a serial asynchronous interface. The Device MCU either queries or receives the wave characterization data from the Sensor MCU firmware through this communication interface in the predefined message format. The proper message handling and integration of the message reporting is handled by the Device MCU.
- Device MCU communicates with Sensor MCU
  - Stores wave characterization report message from the Sensor MCU
  - Provides an interface to change configuration settings of the sensor MCU.
  - Device MCU accepts change in default configurations to the IM U, sensor MCU, and device MCU through USB.[2]
    ○ To change the configuration parameters, a request parameter is sent by the Device MCU and the report parameter is sent by the Sensor MCU. After a write or read command, the Sensor MCU will report the final value of the parameter requested to be changed and the result code of the transaction through the report parameter. These messages are created when in maintenance mode.
- For each server update cycle, the Device MCU performs the following operations:
  - Power on GPS and wait for a stable fix, then power off GPS
  - Generate WCM report messages (gateway or node report)
  - Power on Iridium modem (only for WCM-Sat and WCM-Buoy)
    ○ Wait for satellite to be detected
    ○ Connect to satellite and open channel for communications
    ○ Send WCM report using Short Burst Data (SBD) protocol
    ○ Wait for packet acknowledgment
    ○ Power down Iridium modem
  - Sleep until the next server update cycle or message from RF module
- Device MCU to Local Wireless (Wi-Fi) Module
  - Device MCU switches on Wi-Fi module after server update cycle is complete
  - Device MCU configures Wi-Fi module with the required configuration to set up a valid network
  - Device MCU looks for any connected devices within a specified amount of time
  - If devices are found, WCM establishes a Transmission Control Protocol/Internet Protocol (TCP/IP) connection to transmit WCM gateway report message.
  - Powers down Wi-Fi module
- Sensor MCU
  ⇒ The firmware includes drivers for capturing sensor data from the LSM6DSLTR IMU.
  - Sensor MCU is in sleep mode
  - IMU raises a general-purpose input/output (GPIO) output line high into an interrupt input on sensor MCU
  - Sensor MCU wakes on the interrupt and sets a GPIO output high to notify that it is ready for data (i.e., it has the serial line open)
  - IMU opens the serial line and outputs raw data with the following parameters for all records in the IMU FIFO memory
    - Linear acceleration x
    - Linear acceleration y
    - Linear acceleration z
    - Rate-of-rotation x
    - Rate-of-rotation y
    - Rate of rotation z
  - The Sensor MCU reads the message and sets GPIO output back too low to notify that the read is complete
  - The IMU closes the serial port
  - This process is repeated until the amount of data transferred or timing conditions are met to trigger the wave characterization algorithms
  ⇒ The sensor MCU firmware then initializes the wave characterization algorithms
    - Use transferred IMU data to calculate the wave characterization parameters for the given time period
    - Generate Device MCU and Sensor MCU inter-processor message format
    - Sensor MCU goes back to sleep mode based on its other tasks, and their scheduled timings
- RF Mesh Functions
  › The RF module has the following functions for mesh communications:
    ◊ Network Stack Functions
      - 802.15.4 MAC layer
        ○ Network joining
        ○ Point-to-point communications
        ○ IP protocols (UDP, IP, ICMP)
        ○ Send network announcements for network discovery

- ○ Send network beacon polls to sync communication windows of network
- • 6LoWPAN layer configured as a border router
  - ○ Maintain routing tables and neighbor lists
  - ○ Maintain table of all nodes joined to the network
- ◈ Functions when in gateway mode
  - • Initialize and configure network stack
  - • In deployed (active) state
    - ○ Pass to Device MCU notifications of wave characterization modules in mesh node mode joining the network
    - ○ Pass to Device MCU notifications of wave characterization modules in mesh node mode dropping from the network
    - ○ Pass to Device MCU all UDP packets (wave characterization reports, etc.) received from network
    - ○ Send over network all UDP packets (parameter get / set, etc.) received from Device MCU
    - ○ Process command messages from Device MCU for WCM-Sat functions (e.g., read battery voltage, etc.)
    - ○ Send notifications to Device MCU of motion detection
- ◈ Functions when in mesh node mode
  - • Act as a router node to pass wave characterization messages to the nearest mesh node or gateway
- • Local Wireless Module
  - ➤ Network Stack Functions for Wi-Fi
  - ◈ 802.11 medium access control (MAC) layer
    - • Network joining
    - • Point-to-point communications
    - • TCP/IP protocol
  - ➤ Functions when in gateway mode
    - ◈ Initialize and configure network stack
    - ◈ Power on local wireless module based on trigger from Device MCU (after IMU, sensor MCU, and RF functions have been completed)
    - ◈ In deployed (active) state
      - • Check to see if any device is connected and actively listening at the specified port number. If so, proceed with the next steps, if not, wait a predetermined amount of time for a connection and then power off.[3]
      - • Send over network wave characterization message formats received from Device MCU
      - • Wait for confirmation from wireless device, resend twice if message send failed
      - • Device MCU powers off local wireless module
- • Time Synchronization
  - ➤ The WCMs, when in gateway mode, use the GPS Coordinated Universal Time (UTC) to set and maintain their real-time clock, which is GPS time plus the correction for leap seconds. The WCMs (1) timestamp incoming node WCM messages when received; and (2) add the current UTC time to sync beacons, which allows node WCMs to maintain their RTC. Thus, network-wide RTC time is accurate to about a second.
- • Firmware Segment for Controlling Iridium Modem Module
  - ➤ The device MCU communicates with the satellite modem over an asynchronous serial interface. Control of the modem will use AT (attention) commands. Data packets are sent as Short Burst Data (SBD) messages to the Iridium network. The Iridium gateway sends the messages to the cloud server and GIS interface as Mobile Originated (MO) DirectIP Transfers.
  - ➤ The payload for SBD messages is 340 bytes. This will enable a gateway report message with eight wave characterization modules to be sent in a single packet. If a mesh network has more than 8 joined nodes, then the satellite gateway report message is sent as a multi-block message.
- • Firmware and System Testing
  - ➤ Component level tests:
    - ◈ Power consumption
    - ◈ GPS module testing
    - ◈ Firmware standard testing
  - ➤ Sub-system testing:
    - ◈ Gateway and mesh node modes
    - ◈ Mesh network testing
    - ◈ Satellite gateway communication testing
    - ◈ Local wireless device application testing
    - ◈ Cloud server and GIS user interface testing
- • Operational Modes
  - ➤ The WCM, WCM-Sat, and WCM-Buoy will operate in three different modes:
    - ◈ Low Power Storage Mode (LPSM) - This mode is designed for the devices to have minimum power consumption during storage. Storage beacon messages may be sent for inventory purposes.
    - ◈ Active Mode - This is the mode in which the tags operate during deployment. In this mode, the WCM in gateway mode will act as a network-coordinator host to receive beacons and process data to ascertain the presence of other wave characterization modules through the mesh network. The WCM-Sat and WCM-Buoy will also establish the satellite communication link and run the server update cycle with GPS fix.

◆ Maintenance Mode - This mode can be initiated by issuing an addressed maintenance command message to a target device. In this mode, the configuration parameters can be retrieved and set using commanding messages.

[1] The packet of data that is formatted into a known message type and length (e.g., WCM gateway or node report) to be sent to the "server" which can be the mobile application database if sent through WiFi or the Amazon cloud server and GIS user interface web application if sent through Satellite.
[2] The WCM is interfaced via a USB hardware (physically and functionally on the Device MCU) connection to a laptop computer to read settings data and to write new settings data as needed. The Device MCU will send any updates to the WCM subsystems such as the sensor MCU and IMU.
[3] The WCM WiFi module waits for a confirmation that the tablet has connected. Once this connection has been confirmed, it attempts to send the wave characterization data message via WiFi to the tablet.

Figure 6:
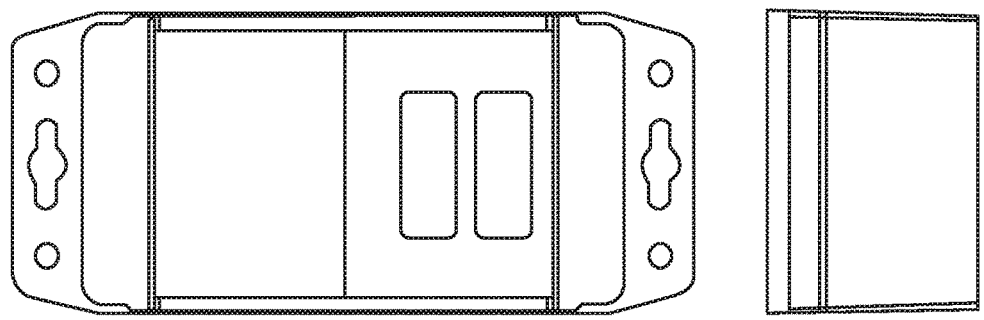
FIG. 6 shows dimensional drawings of the GRIDSAT tag container with FIG. 6A showing the enclosure from above and FIG. 5B showing the enclosure from one end.

As shown in FIG. 6, the GRIDSAT tag enclosure is very similar to the GRID tag enclosure. The enclosure employs thick-walled polycarbonate plastic with elastomer and pressurized screws to provide IP67 sealing. The enclosure can be coated by a conformal deposition of hydrophobic material including Parylene C or dedicated antenna hydrophobic position locator pads. FIG. 6A shows the enclosure from above while FIG. 6B shows the container from the end. In FIG. 6A, the length L is 7.89 in. (200.41 mm); in FIG. 6B, the height H is 2.44 in. (61.98 mm) while the width W is 3.57 in. (90.68 mm). When deployed, the enclosure can be attached to an asset via tie wrap, zip ties, screws, tape, or other adhesives designed to meet the specific deployment requirements.

Figure 7:
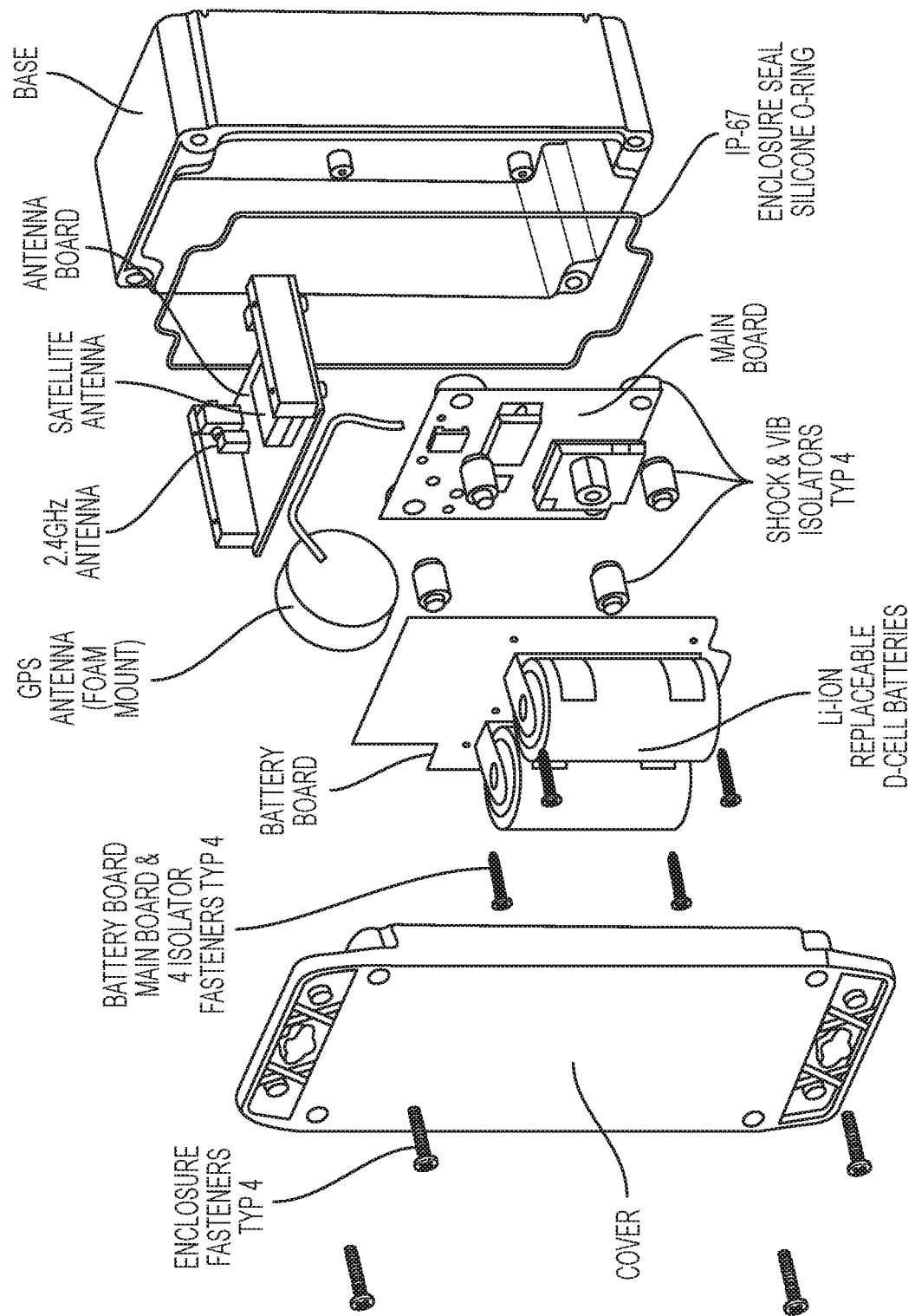
FIG. 7 is a diagrammatic representation of the internal components of the GRIDSAT tag.

FIG. 7 shows a three dimensional assembly view of the GRIDSAT enclosure and components to illustrate assembly. The enclosure consists of a base 60 and cover 62. The main board 64 is located below the batteries 31. An antenna board 66 contains the satellite antenna 46" as well as the 2.4 GHz antenna for the mesh radio. The GPS antenna 46' is located apart from the antenna board.

Figure 4:
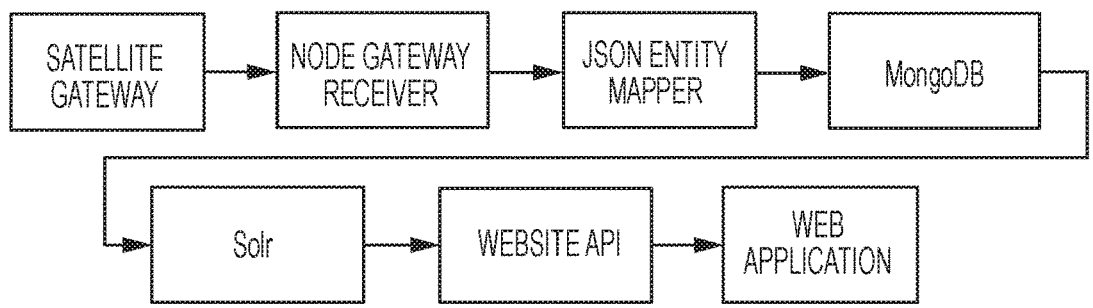
FIG. 4 is a flow diagram of the "cloud" software portion of the invention.

Cloud infrastructure provides the backend data acceptance from the satellite gateway, processing and interpreting key tag information, such as location, to a web-accessible map displayed for the end user. FIG. 4 diagrams the data flow within the cloud infrastructure. Data flow from the satellite gateway 20 through the Node Gateway Receiver 48 to the JSON Mapper 50. The processed data are translated by a Node Processing Engine 51 (not shown) and stored in a Mongo database 52. The stored data are indexed by a Solr indexing engine 54. The data are passed to a website API (application programming interface) 56 and displayed to the user through a web mapping application 58. The cloud infrastructure consists of the software components listed below, which process the Tag Domain Reports 16 requested from the satellite gateway 20. In the current embodiment, the software components are deployed and run on the Amazon Web Services cloud servers. It will be understood that the software could also be deployed on another service provider or be located on private Internet-connected servers. A brief explanation of the software components follows:

1. NginX reverse proxy—Manages incoming requests from the satellite gateway. It facilitates which ports are open and what systems can communicate through those ports. It works in tandem with the system's firewall.

2. Node Gateway Receiver 48—Listens for packages sent by the satellite, and once received, starts the processing engine.

3. JSON Entity Mapper 50—The node gateway receiver server uses the JSON configuration file to translate messages into entities the database can use. If the gateway changes protocols, or the gateway provider changes, the entity mapper can be updated without affecting the rest of the subsystem.

4. Node processing engine 51—Receives incoming messages and translates them into MongoDB database entities.

5. MongoDB database 52—Stores the translated entities from the node processing engine. The database structure defines what the entities are and the formats of each of their attributes.

6. Solr 54—The indexing engine that provides fast search capabilities.

7. Node Web API function—The node processing engine runs on the same cloud server (e.g., Amazon Web Services server) as referenced above; however, the cloud server functions, in the context of this function, as a Web and Application Programming Interface (API) server for the mapping application.

8. Koop—Is a data translation engine that can format the database entities into a consumable format for Web-based systems.

9. Turf.js—Is a spatial data manipulation engine used to conduct spatial queries and format MongoDB data into GeoJSON.

10. Web Mapping Application 58—The user interface that displays interactive features that represent the tags in the field and the messages and status that they emit over time. "Leaflet" is currently the application of choice. Leaflet is free to use, but does not contain map imagery. Therefore, Map Box (a paid service that provides base maps) is combined with Leaflet to provide the necessary map imagery.

The Cloud-Based Data Server hardware that was chosen for this project is sufficient for prototyping and proof of concept. Because of Amazon Web Service's scalability, what is done on a small scale using the Amazon platform can readily be upgraded to support a larger, production-ready environment. The hardware chosen is suitable to support all software components of this project including: NginX, the Node Ingestion server, MongoDB database, and the web-mapping application. The Amazon Web Services data centers are staffed 24/7 by trained security guards, contain environmental systems to minimize the impact of disruptions, and span multiple geographic regions to provide resiliency to both manmade and natural disasters.

GIS Software Application Package. After the NginX reverse proxy accepts the incoming requests from the satellite gateway, the GIS software application package 26, mentioned above, which consists of the node gateway receiver and processing server, uses the JSON entity mapper to parse the GRIDSAT tag, produce Tag Domain Reports, and store the data in the MongoDB database deployed on the Amazon Web Services server. After the data are stored, they are immediately indexed and made available to search using the front end mapping application.

Mapping API. The user interface is designed to provide all of the desired functionality while maintaining ease of use for novice users. Desired functionality is as follows:

GRIDSAT tags viewable on a map;
Visible status indication of GRIDSAT tags;
Clicking GRIDSAT tags displays additional information about GRID tags;
User can review the history details of the GRIDSAT tags.

A "House of Quality" QFD (quality function deployment) was performed to assess factors affecting the quality of the system. Table 5 (below) shows the derived House of Quality, where Interrelationship Weightings indicate values for which a value of 1 represents Weak, a value of 3 represents Moderate, and a value of 9 represents Strong:

| | | | | Engineering Requirements | | | | | | | | | | | |
|---|---|---|---|---|---|---|---|---|---|---|---|---|---|---|---|
| | | GRID Tag | | | | | | GRIDSAT Tag | | | | | | | |
| | Customer Requirements | Importance wt. | Point-to-Point Communication 1 | Firmware 2 | Deployment Means 3 | Physical Design 4 | Battery Power 5 | Tag Longevity 6 | Point-to-Point RF Communication 7 | Satellite Communication 8 | GPS Module 9 | Firmware 10 | Deployment Means 11 | Physical Design 12 | Battery Power 13 | Tag Longevity 14 |
| 1 | Mark Equipment Location | 0.25 | 3 | 3 | 3 | 3 | 3 | 3 | 3 | 3 | 9 | 3 | 3 | 3 | 3 | 3 |
| 2 | On Station > 6-9 months | 0.15 | 9 | 3 | 3 | | 9 | 9 | 9 | 9 | 9 | | 3 | | 9 | 9 |
| 3 | Compact Size | 0.05 | 9 | | 3 | 9 | 9 | 3 | 9 | 9 | 9 | | 3 | 9 | 9 | 3 |
| 4 | Compatibile w/Marine Environment | 0.15 | 3 | | 9 | 9 | 3 | 3 | 3 | 9 | 3 | | 9 | 9 | 3 | 3 |
| 5 | Temperature Range (to −40 C.) | 0.15 | 3 | | 9 | 9 | 3 | 3 | 3 | 9 | 3 | | 9 | 9 | 3 | 3 |
| 6 | Ease of Deployment | 0.05 | | | 9 | 9 | | | | 9 | 9 | | 9 | 9 | | |
| 7 | Cost Effective | 0.05 | 3 | 9 | 3 | 9 | 9 | 3 | 3 | 9 | 9 | 9 | 3 | 9 | 9 | 3 |
| 8 | Communication Range | 0.10 | 9 | 9 | 3 | 3 | 9 | 3 | 9 | 9 | 3 | 9 | 3 | 3 | 9 | 3 |
| 9 | Maximum use of COTS Products | 0.05 | 3 | 3 | 1 | 3 | 3 | 1 | 3 | 9 | 9 | 3 | 1 | 3 | 3 | 1 |
| 10 | Initial Importance | 1.00 | 4.65 | 2.70 | 5.00 | 5.25 | 4.95 | 3.65 | 4.65 | 7.50 | 6.60 | 2.25 | 5.00 | 5.25 | 4.95 | 3.65 |

Based the analysis from House of Quality, Satellite Communication received the highest technical priority. Satellite communication's importance comes from three major aspects: (1) It provides the critical link for data transfer between mesh network and the cloud server; (2) Integration of the satellite modem into GRIDSAT has impacts in form factor, size, and cost; (3) Operation of satellite communication in the GRIDSAT tag is a main contributor for power consumption; therefore, selection and sizing of battery are affected.

Essentially all of the system components are "off the shelf," making the system cost effective and easy to assemble. Table 6 (below) provide component information:

| | | Weight (grams) | Cost ($) |
|---|---|---|---|
| | Key GRID Tag BOM Item | | |
| 1 | RF and MCU chipset with PA & LNA, JN5168-001-M06 | <3 | <19 |
| 2 | Power regulator, TPS781 | <0.5 | <0.5 |
| 3 | Power regulator, LD39100 | <1 | <0.7 |
| 4 | Motion & acceleration sensor, ADXL362 | <0.5 | <4 |
| 5 | Antenna, ANT-2.4-JJB | <2 | <2.20 |
| 6 | Battery primary A cell Bobbin, LS17500 | <22 | <4.5 |
| 7 | Enclosure | <140 | <15 |
| | Key GRIDSAT Tag BOM Item | | |
| 1 | Satellite module, Iridium 9603 | 11.5 | <175 |
| 2 | GPS module, MAX_7 | <1 | <59 |
| 3 | RF and MCU chipset with PA & LNA, JN5168-001-M06 | <3 | <19 |
| 4 | MCU, LPC11U68JBD48 | <1 | <4 |
| 5 | Iridium antenna, IP.1621.25.4.A.02 | 10 | <6.5 |
| 6 | GPS antenna, FXP611.07.0092C | <2 | <14 |
| 7 | Mesh antenna, ANT-2.4-JJB | <2 | <2.20 |
| 8 | Motion & acceleration sensor, ADXL362 | <0.5 | <4 |
| 9 | Power conversion IC, TP563060 | <0.5 | <3.2 |
| 10 | Power conversion IC, LTC3103 | <0.5 | <4 |
| 11 | Power regulator, LP3962 | <0.5 | <3 |
| 12 | Power regulator, TLV70233 | <0.5 | <0.5 |
| 13 | Power regulator, TP5781 | <0.5 | <0.5 |
| 14 | Battery primary 2 × D cell Spiral, ER34615M | <220 | <15 |
| 15 | Enclosure | <260 | <18 |

|   | Key Cloud Infrastructure BOM Item | Weight (grams) | Cost ($) |
|---|---|---|---|
| 1 | Satellite Gateway, Iridium (DISA) | N/A | 0 |
| 2 | Servers, Amazon Web Services, EC2 General Purpose Previous Gen. m1 small + 10 GB Elastic Block Store (EBS) @ 2.35 GHz | N/A | 33/month |
| 3 | GIS software application package, Node w/Koop, Version 0.10.32 | N/A | 0 |
| 4 | HTTP server and reverse proxy, NginX, Version 1.4.0 | N/A | 0 |
| 5 | Mapping API, Leaflet, Version 0.6.4 | N/A | 0 |

Table 7 (below) represents the GRID and GRIDSAT tags' estimated mean time to failure (MTTF). MTTF (Hours) is determined by adding up the total failure rates and calculating (1/(Total Failure Rates/1,000,000 hours)):

| Estimated Mean Time To Failure Analysis for GRID and GRIDSAT Tags | | | |
|---|---|---|---|
| Item No. | Item | Quantity | Failure Rate (FPMH) |
| | GRID | | |
| | RF Module | 1 | 1 |
| | MCU | 1 | 0.1 |
| | Enclosure | 1 | 3 |
| | Motion Sensor | 1 | 1 |
| | Flash | 1 | 0.1 |
| | Total Failure Rate | | 5.2 |
| | MTTF (Hours) | | 192, 308 |
| | MTTF (Years) | | 21.95 |
| | GRIDSAT | | |
| | RF Module | 1 | 1 |
| | GPS | 1 | 1 |
| | MCU | 1 | 0.1 |
| | Sat Modem | 1 | 1 |
| | Enclosure | 1 | 3 |
| | Motion Sensor | 1 | 1 |
| | Flash | 1 | 0.1 |
| | Total Failure Rate | | 7.2 |
| | MTTF (Hours) | | 138, 889 |
| | MTTF (Years) | | 15.85 |

The estimated MTTF are 21.95 years and 15.85 years for GRID Tag and GRIDSAT Tag, respectively. The estimations did not include the batteries for both tags. If a battery with 10 FPMH is accounted for, the MTTF for a GRID Tag would be 7.51 years, which is 2-5× longer than the battery life. Similarly, for a GRIDSAT Tag, the MTTF with battery would be 4.20 years, which is more than four times the battery life designed for this application.

Table 8 below summarizes the mesh signal budget and link reliability between two adjacent mesh nodes (i.e., point-to-point mesh link) for GRID and GRIDSAT tags. The link budget is also derived for the case where a transmit power amplifier (PA) and a receive low nose amplifier (LNA) are added. The additions of the PA and LNA provide a link reliability of greater than 99 percent throughout over a 1200 ft. (365.8 m) range for typical environment loss conditions in spite of multi-path, fading, orientation, enclosure, etc. In high environment loss conditions, which include an additional 20 dB loss over typical conditions caused by various effects, including ice formation, a 99% reliable range of 420 ft. (128 m) is obtained. The 99% reliable range for the tags without PA and LNA under typical loss conditions is 400 ft. (122 m).

| Mesh Link Budget (single hop) | | | | |
|---|---|---|---|---|
| | w/o PA & LNA | | With PA & LNA | |
| | Typical conditions | Lossy conditions (wet, thin ice, etc.) | Typical conditions | Lossy conditions (wet, thin ice, etc.) |
| Tx Power | 2.5 dBm | 2.5 dBm | 22 dBm | 22 dBm |
| Rx Sensitivity | −95 dBm | −95 dBm | −100 dBm | −100 dBm |
| Tx/Rx Antenna Gain | −1 dB | −1 dB | −1 dB | −1 dB |
| Tx Loss | 2 dB | 2 dB | 2 dB | 2 dB |
| Propagation Loss | 78 dB @ 300 ft. (91.4 m) | 78 dB @ 300 ft. (91.4 m) | 100 dB @ 1000 ft. (304.8 m) | 100 dB @ 1000 ft. (304.8 m) |
| Rx Loss | 2 dB | 2 dB | 2 dB | 2 dB |
| Other environment related losses | 8 dB | 18 dB | 8 dB | 28 dB |
| Link reliability >99% | Range <400 ft. (122 m) | Range <240 ft. (73.2 m) | Range <1200 ft. (365.8 m) | Range <420 ft. (128 m) |

Environmental testing included operation at temperature extremes, water immersion, shock, and vibration. The results are presented in the following paragraphs for both the GRIDSAT and GRID tags.

Temperature. The Tenney BTRC (Benchmaster Temperature/Relative Humidity Test Chamber) environmental chamber was used to test the system from minus 50° C. to 80° C. The mesh, GPS, and Iridium modem antennas were connected outside of the chamber with cables. The mesh network beacon rate was set to 10 seconds, and system functionality was verified by successfully beaconing the GRID tag to the GRIDSAT and reporting to the satellite by initiating a transmission through the GRIDSAT universal serial bus (USB) interface over time and temperature extremes. We employed Saft 17500 and Xeno XL-100F A-cell batteries for GRID tags in our tests; these tests showed current delivery deterioration at temperatures above 75° C., which in some instances affected the tag's functionality. The GRIDSAT batteries Fanso ER34615M D-cell worked without any interruption in all the tests conducted up to 81° C., and all batteries operated successfully down to minus 50° C.

GRIDSAT and GRID tags were both subjected to the water immersion test at greater than 1.1 meters. The temperature was set at 25° C. for immersions of 15 minutes, 1 hour, and 12 hours; this testing was repeated at a temperature of −5° C. In all six previously mentioned immersion tests, there were no leaks. A drop test (high gravity test) on concrete was performed. The GRID and GRIDSAT tags were dropped onto a concrete floor four times each from a height of 6 ft. (1.83 m) and no damage was observed. The devices were tested on an Unholtz-Dickie shaker system (Model 630) at the laboratories of the Electrical and Computer Engineering Department of the University of Michigan to simulate vibrational conditions. The peak acceleration was set to 5 g at the 20 to 2,000 Hz frequency range. After the vibration tests, the devices were opened for visual inspection and verified to be fully functional.

The aforedescribed GRID tagging system may be used to record, interpret, and report data regarding water waves. Such a system may provide wave condition data immediately to local operators and, when deployed throughout a region, collectively report actionable information to stakeholders. Illustratively, this system may be used to ascertain and communicate various properties of waves (e.g., wave height, length, and period), so as to enhance situational awareness during, e.g., an oil spill response, and assist stakeholders and mechanical skimming operations. See FIG. 13.

Figure 13:
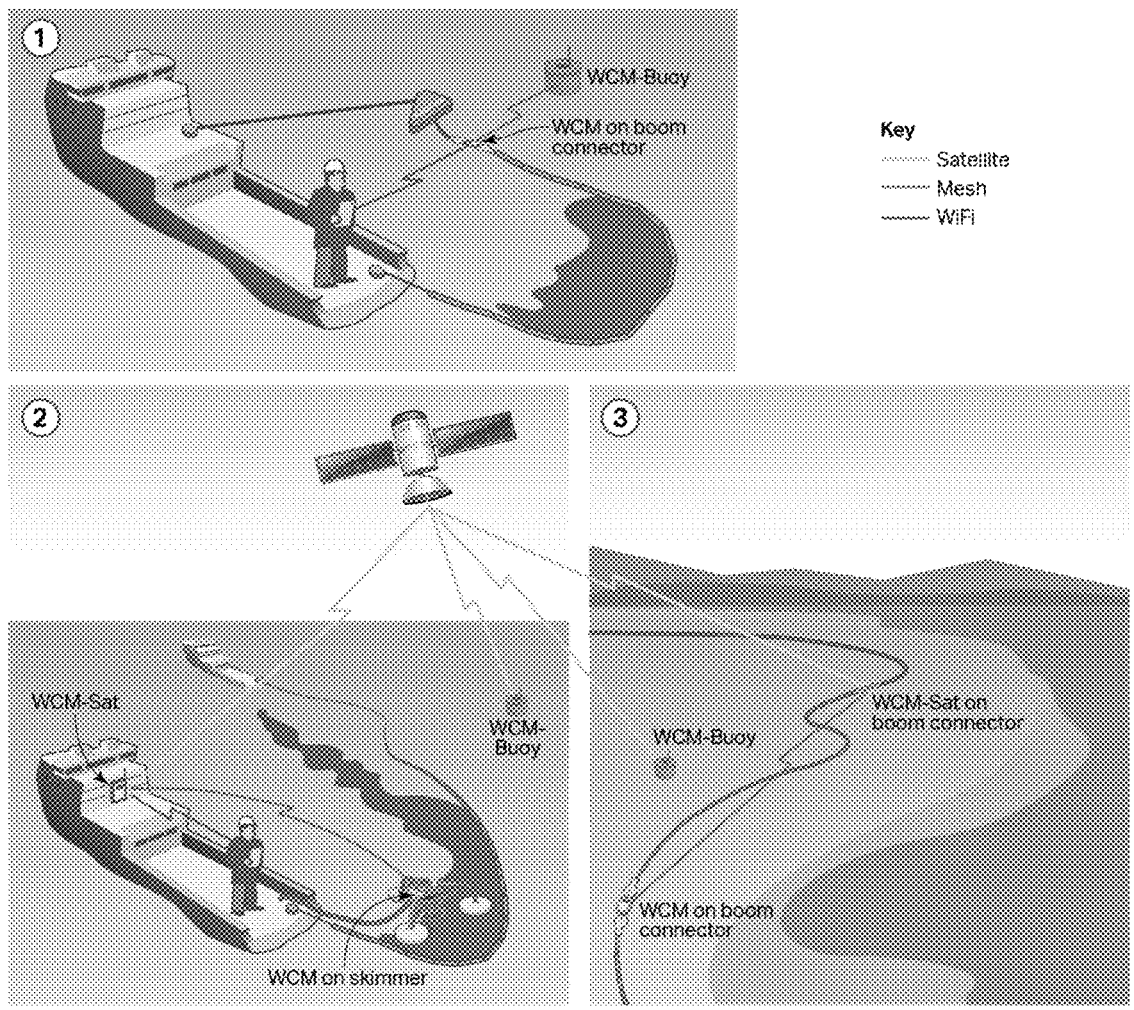
FIG. 13 depicts Wave Characterization Module (WCM) concept of operations.

FIG. 13 illustrates three scenarios that reflect the WCM concept of operations. Scenario #1 shows a WCM-Buoy characterizing local wave conditions and transmitting information through the mesh network to a WCM. The WCM passes along the WCM-Buoy and its own data via Wi-Fi for display on a local application dashboard, providing continuous updates to the response vessel's operators. Scenario #2 shows a WCM attached to a skimmer transmitting wave conditions through the mesh network to a WCM-Sat for aggregation, summarization, and transmission via Wi-Fi to a local user, as well as to the satellite gateway, onto the cloud database for display on the GIS user interface for remote stakeholders to view. The free-floating WCM-Buoy calculates local wave conditions and reports conditions through the satellite gateway for display on the GIS user interface. Scenario #3 shows a boom protecting an environmentally sensitive shoreline with the WCM transmitting local wave conditions through the mesh network to a WCM-Sat, which then aggregates the wave conditions for transmission to the satellite gateway for display on the GIS user interface. Independently, WCM-Buoys deployed throughout the response area report their local wave conditions to the satellite gateway for viewing on the GIS user interface to provide a regional outlook.

In one embodiment, GRID and GRIDSAT tags are equipped with (1) IMUs and associated Sensor MCUs and (2) a Wireless Module, such as Wi-Fi or Bluetooth, for local communication to create WCMs and WCM-Sats (or WCM-Buoys), respectively. Such equipment, in conjunction with wave characterization algorithms, enables a GRID tagging system to record, interpret, and report wave data (i.e., a WCM System). WCMs may be mounted on, e.g., commercially available mechanical skimmers to measure wave characteristics and provide quantitative feedback to operators and stakeholders during inter alia oil spill response and recovery operations.

As with a GRID or GRIDSAT tag, a WCM, WCM-Sat, or WCM-Buoy can be configured in either a gateway mode or a node mode. When configured as a node, a WCM, WCM-Sat, or WCM-Buoy can only communicate its data through the mesh network to another device in the network. In this mode, there is no pre-configuration required; a device in node mode may autonomously join a network, and data may hop from node to node depending on signal strength and availability to reach a gateway module. When a device is configured as a gateway, it automatically reports its data and the data from the nodes in its mesh network to (1) a local user interface on a mobile device application dashboard via Wifi; and (2) a remote GIS user interface through the satellite gateway via the Internet to a cloud-based server. Each device in the system needs to be configurable as a node to pass along measurement information or as a gateway to report the collected data.

WCMs are intended to attach to a piece of equipment, such as a skimmer, and include the hardware and software required to characterize wave conditions. The WCM includes a global positioning system (GPS) for accurate time keeping and location, radio frequency (RF) module for local mesh communications from device to device, and a Wifi module for direct communication to a local mobile device (e.g., a tablet or smartphone) for the display of wave characterization information on an application dashboard. To provide a desired range of communication for field operations, (1) the Wifi module may be swapped out with an integrated antenna internal to the WCM's enclosures with a Wifi module and external antenna to increase local communication range; and (2) the mesh radio network may be strategically used to extend the effective communication range from one WCM, WCM-Sat, or WCM-Buoy in node mode by inserting an additional device between the target node and gateway, allowing information to hop through one or more intermediate nodes to the final destination of a WCM, WCM-Sat, or WCM-Buoy configured as the gateway. Illustratively, a WCM-Buoy characterizing local wave conditions can transmit information through the mesh network to a WCM. The WCM then passes along the WCM-Buoy and its own data via Wifi for display on a local application dashboard, providing continuous updates to a response vessel's operators.

WCM-Sats include all of the hardware and software of the WCM for wave characterization, GPS, mesh, and Wifi communications. A WCM-Sat is intended to attach to high-value assets, such as a vessel, as well as boom connectors. WCM-Sats can provide remote reporting of location information, status, and wave conditions through the global satellite network. Illustratively, WCMs (e.g., attached to skimmers) can transmit wave conditions through the mesh network to a WCM-Sat for aggregation, summarization, and transmission (1) via Wifi to a local user and/or (2) to the satellite gateway, and onto the cloud database, for display on a GIS user interface for remote stakeholders to access.

WCM-Buoys include all of the hardware and software of a WCM-Sat but are intended to be free-floating and stay for an extended period on station reporting wave conditions. Illustratively, WCM-Buoys, independent of any WCMs and WCM-Sats, may be deployed throughout a response area, so as to report local wave conditions to a satellite gateway and to provide remote stakeholders with a regional outlook.

WCMs, WCM-Sats, and WCM-Buoys can be attached to a variety of equipment, such as booms, skimmers, buoys, and vessels. When such a WCM device is attached to a boom or a skimmer, the device may have more than one degree of freedom reduced or eliminated, in which case additional modeling of the attached device data would be required to characterize correctly waves in operational conditions.

Figure 8:
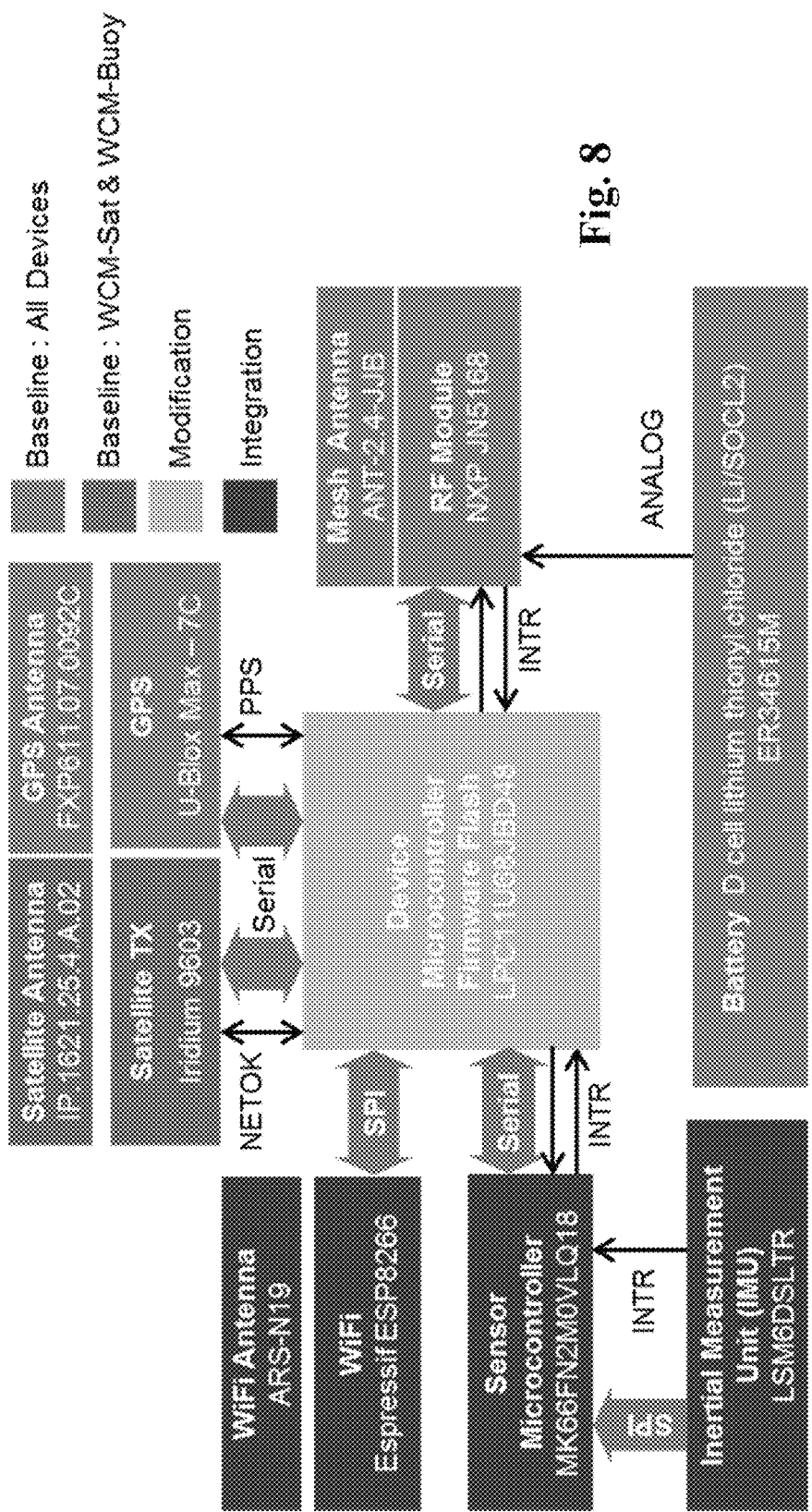
FIG. 8 is a schematic representation of the WCM, WCM-Sat, and WCM-Buoy hardware component architecture.

FIG. 8 depicts the hardware architecture of WCMs, WCM-Sats, and WCM-Buoys (collectively, WCM Devices) vis-à-vis GRID and GRIDSAT tags'. Common to all GRID and GRID-Sat tags, WCM Devices each contain a (1) GPS Antenna and GPS; (2) a mesh antenna and RF Module; (3) and a battery (e.g., a D cell lithium thionyl chloride (Li/SOCL$_2$) ER34615M). In addition, like all GRID-Sat tags, WCM-Sat and WCM-Buoys contain a satellite antenna and a satellite transmitter (TX). All WCM Devices have a Device MCU that is modified for the WCM System, which processes Sensor MCU messages and commands. Moreover, all WCM Devices have integrated into them: (1) a Wi-Fi antenna and Wi-Fi; and (2) an IMU with an associated Sensor MCU. In other embodiments, the Device and Sensor MCUs' respective functions could be performed by a single MCU.

Table 9 below provides further information pertaining to specific embodiments of the hardware components depicted in FIG. 8. The Device MCU can be a low-power MCU that coordinates the activity of each hardware component and which interfaces with serial ports for communication with the GPS, satellite modem, local wireless module, Sensor MCU, and RF module. The IMU may incorporate a 3-axis accelerometer and 3-axis gyroscope, whereas the associated Sensor MCU runs algorithms on IMU data to calculate wave parameters and transfer said results to the Device MCU. The Wifi Module delivers wave characterization data locally. The RF Module may be a 2.4 GHz 6LoWPAN module with support for application tasks built into its firmware. The GPS may be a low power and voltage GPS module. Finally, the Satellite Modem (e.g., an Iridium 9603) is used for communications to the cloud server and GIS interface.

| Component | Model | Interface | Description |
| --- | --- | --- | --- |
| IMU | LSM6DSLTR | SPI and interrupt | 3-axis accelerometer and 3-axis gyroscope with 4 kB FIFO |
| Sensor MCU | MK66FN2M0VLQ18 | GPIO for interrupt Serial port communication to the device MCU | Runs algorithms on IMU data to calculate wave parameters and transfers results to the device MCU |
| Wifi Module | E5P8266 | SPI bus Power on/off digital signal | Wifi chipset to deliver wave characterization data locally |
| Device MCU | LPC11U68JBD48 | Serial ports for communications with the GPS, satellite modem, local wireless module, sensor MCU | Low-power ARM-based MCU that coordinates the activity of each hardware component |
| RF Module | JN5168-001-M06 | Serial interface and interrupt | 2.4 GHz 6LoWPAN module with support for application tasks built into its firmware |
| GPS | MAX_7C | Asynchronous serial port and 1 PPS signal to connect to the device MCU Power on/off digital signal | Low power and voltage GPS module |
| Satellite Modem | Iridium 9603 | Network ready signal to connect to the device MCU Asynchronous serial port for data Power on/off digital signal | Satellite modem module for communications to cloud server and GIS interface |

6LoWPAN = Internet protocol v6 over low-power wireless personal area networks
ARM = advanced RISC [reduced instruction set computer] machine
FIFO = first in first out
GHz = gigahert
GIS = geographical information system
GPIO = general-purpose input/output
GPS = global positioning system
IMU = inertial measurement unit
kB = kiloByte
MCU = microcontroller unit
PPS = pulse per second
RF = radio frequency
SPI = serial peripheral interface The Device MCU powers on the Sensor MCU and IMU. Upon initialization, the Sensor MCU starts to collect data from the IMU and processes the raw sensor data through the wave characterization algorithms. The resultant wave information is sent to the Device MCU for packing into a predefined message format. The Device MCU powers off the Sensor MCU and IMU and powers on the GPS Module to receive the current time and location. If the device is in node mode, the message is set out through the RF Module via the mesh network to a gateway device. If the device is in gateway mode, the Device MCU receives all node messages through the RF Module and generates a wave characterization report, sending the message first via Wifi, and then via satellite (in the case of WCM-Sats and WCM-Buoys).

Figure 10:
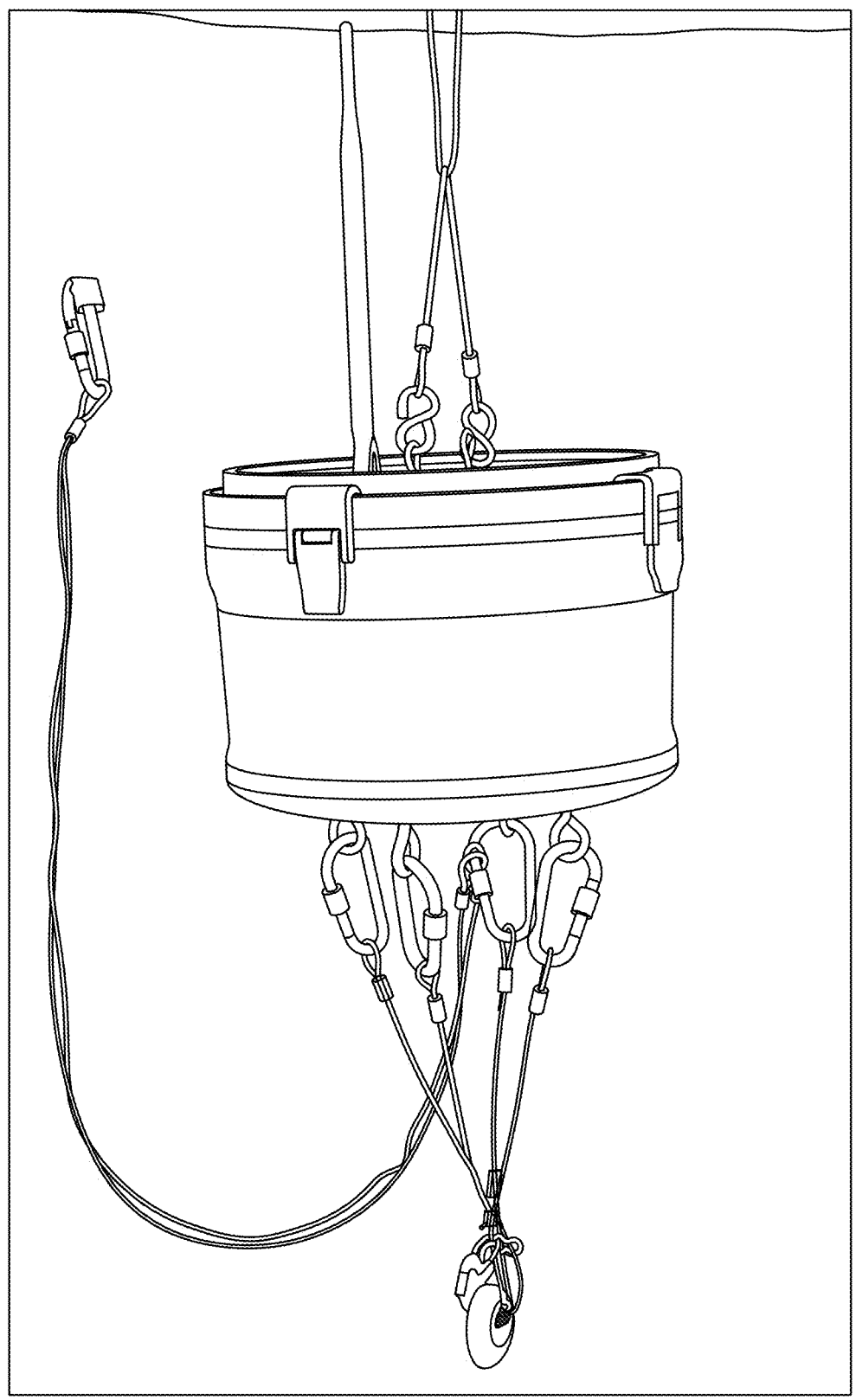
FIG. 10 depicts a WCM-Buoy enclosure with external antennas and counter-balance weight.

FIG. 9 consists of dimensional drawings for embodiments of the WCM and WCM-Sat. Enclosures for WCMs and WCM-Sats use thick-walled polycarbonate plastic with pressurized screws to provide IP67 sealing, which provides protection for immersion in up to 1 meter of water for 30 minutes. FIG. 10 depicts an embodiment of a WCM-Buoy enclosure, which is constructed of polypropylene and painted to be resistant to marine environments. The WCM-Buoy enclosure can withstand being dropped without damage to the case material. The case material is almost the same density of water (×1.1), such that a minimal amount of air captured in the circuitry compartment is enough to keep the WCM-Buoy afloat. The WCM-Buoy is designed so that approximately 75 percent is submerged to minimize wind impact on measurements. The bottom has several attachment points for tethering and for various weights to dampen unwanted motion when deployed. The satellite, Wifi, and GPS antennas are epoxied (with marine-grade epoxy) into a recessed lid compartment, with a 1/16 inch plastic cover epoxied over the antennas.

A wave on any body of water (e.g., an ocean wave) is the flow of energy traveling from its source, not the water itself, and therefore, anything floating on top of a wave, such as a buoy, moves in a circular rise-and-fall pattern. A WCM-Buoy or WCM attached to an object such as a skimmer floating on the water's surface can be equipped with an accelerometer to measure its own movement from crest to trough, which translates to the peak to trough movement of the wave at that particular point. Thus, a WCM device can measure wave elevation from the surface of the water.

Although "simple" waves, i.e., well-defined sinusoidal motions, are readily analyzed by elementary methods, their regularity fails to approximate the variability of actual ocean waves. Outside of a wave tank, one never sees a constant progression of identical waves. Instead, the water surface is a superposition of waves of varying heights and periods moving in differing directions. When the wind blows and the waves swell in response, a wide range of heights and periods is produced. When a WCM Device measures waves at a fixed location on a given body of water, the wave signals it outputs will be irregular, and although individual waves can be identified, there will always be significant variability in height and period from wave to wave. Consequently, it is necessary to treat the characteristics of the water surface in statistical terms.

The surface of a body of water comprises many wave components that are generated by the wind (e.g., in different regions of an ocean) and then propagated to the point of observation. Complex wave distributions are difficult to obtain in explicit form from a random wave model, but numerical algorithms based on the regression approximation work well. This method of calculating wave distributions gives correct answers that are valid for general spectra. For example, an open-source matrix laboratory (MATLAB) software Wave Analysis for Fatigue and Oceanography (WAFO) toolbox, a third-generation package of MATLAB routines for statistical analysis and simulation of random waves, can calculate the distributions of wave characteristics from observed power spectra of a body of water as measured by a WCM Device. The WAFO provides a comprehensive set of validated computational tools for statistical analysis of random waves and a marine structure's responses to them. In a random wave model, the distribution of wave characteristics, such as wave period and crest-trough wave height, can be calculated with high accuracy for almost any spectral type.

To determine the wave characterization information sent to a user, a WCM Device first uses the onboard IMU and sensor MCU to record and process the raw data. The IMU reports the acceleration and angular velocity at a given sampling rate from the 3-axis accelerometer and gyroscope. The majority of the motion of a WCM Device is up and down or heave motion. The displacement calculation may be simplified by using the scalar magnitude of the 3-axis accelerometer data instead of complicated calculations using the gyroscope data. Scalar magnitude is the square root of the sum of the squares of each component of acceleration: the sqrt(x-axis$^2$+y-axis$^2$+z-axis$^2$) for each sample (i.e., for each data point in time). The acceleration of the heave signal component may be integrated twice to calculate the total heave of a body of water. Using the heave measurements, standard oceanography spectral and statistical analysis can be performed to calculate the wave characterization values sent to a user.

To convert the accelerometer data to heave, a Fast Fourier Transform (FFT) calculation is used, which converts the data from the time domain into the frequency domain. The data are then filtered to isolate the wave frequencies of interest. The filtering process determines the wave angular frequency ($\omega$) values of the data. This angular frequency information may be then used to calculate the period of a wave in seconds that will be sent to the user. In addition, if the frequency data, i.e., a vector of data that is created from the FFT performed on the accelerometer vector data, are divided by $\omega^2$, and an Inverse Fast Fourier Transform (IFFT) is performed, one can calculate the heave of the WCM Device. Using the heave data, one can run the WAFO to obtain spectral and statistical analysis of the heave to determine wave characteristics, including wave length and height; wave height is reported as significant wave height ($Hm_0$); the $Hm_0$ is presently defined as four times the standard deviation of the wave surface or four times the square root of the zeroth-order moment of the wave spectrum. Significant wave height can be reported as $H_{1/3}$, the average of the highest third of the wave heights.

Figure 11:
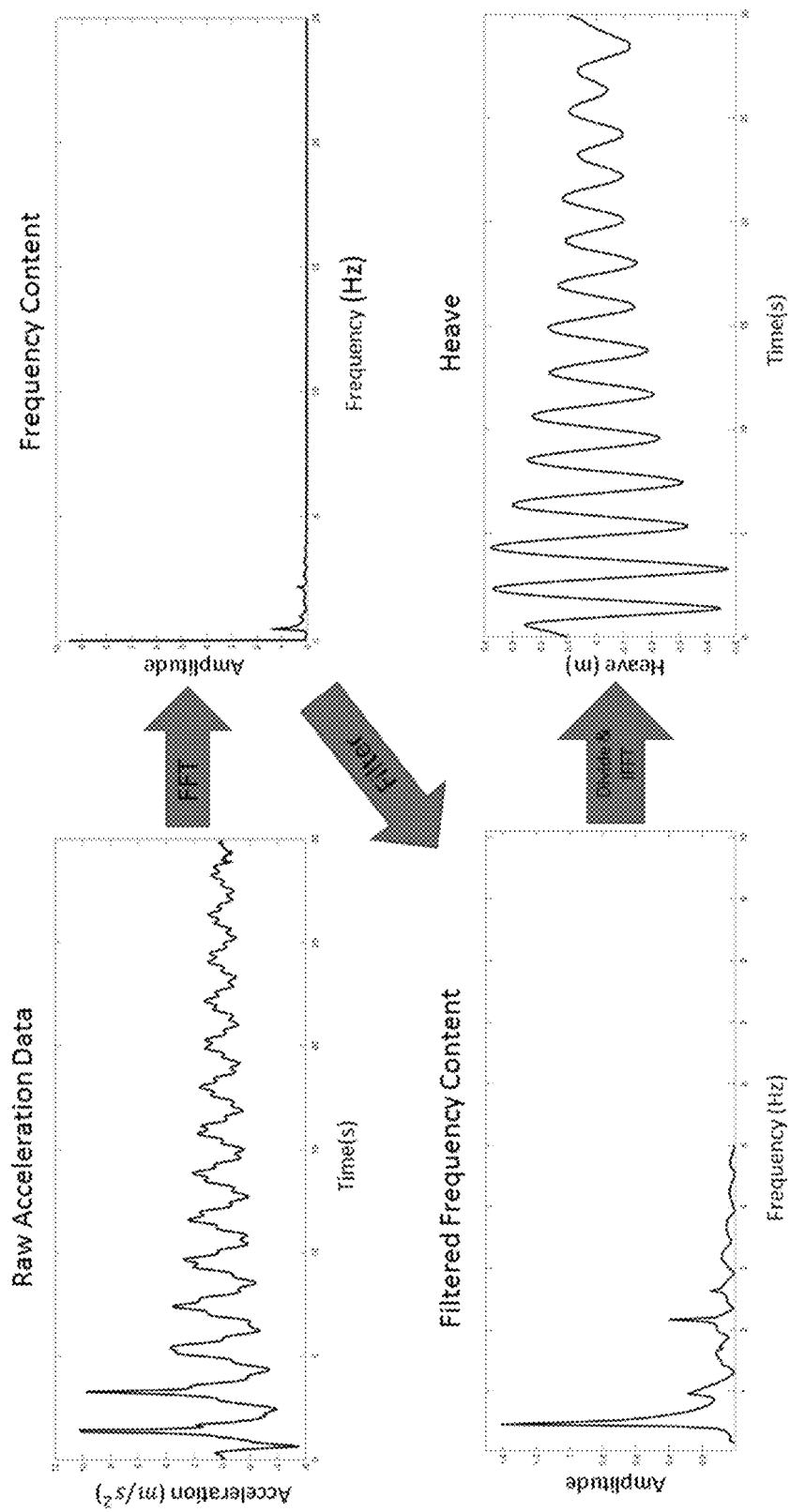
FIG. 11 depicts plots of wave characterization algorithm steps from acceleration to heave.

FIG. 11 shows the steps of the algorithm for determining the heave of a sensor within a WCM Device. The data in this figure are derived from a test performed by the inventors. In particular, the inventors sighted the maximum displacement at approximately 35.4 in (0.9 m). The top left graph shows the raw accelerometer data. The top right graph shows the frequency spectrum of the data after an FFT has been performed. The frequency data were then filtered to isolate the wave frequencies and remove the noise, as seen in the bottom left plot. Then, the frequency data were divided by $\omega^2$, and an IFFT was performed to create the plot in the bottom right of the heave. In the test, the maximum heave was approximately 0.39 m., and the minimum heave was approximately −19.3 in (−0.49 m). The heave plot shows a total displacement of about 34.6 in (0.88 m), which is less than 0.98 in (0.025 m) in difference to the displacement noted visually during the data acquisition. No significant noise was observed; moreover, the investigators did not notice any discernable drift in the sensor during data capture. Using the heave data, the inventors then ran the standard ocean wave spectral analysis and statistics using the WAFO software from MATLAB to calculate the wave data to be sent to the end user. Once the MATLAB algorithms were finalized, they were converted to C code and programmed into the Sensor MCU. By using the scalar magnitude of the acceleration, the inventors removed the need to store any gyroscope data on the sensor MCU, which allowed for a higher sampling rate and longer data collection period on the final WCM Device.

Figure 12:
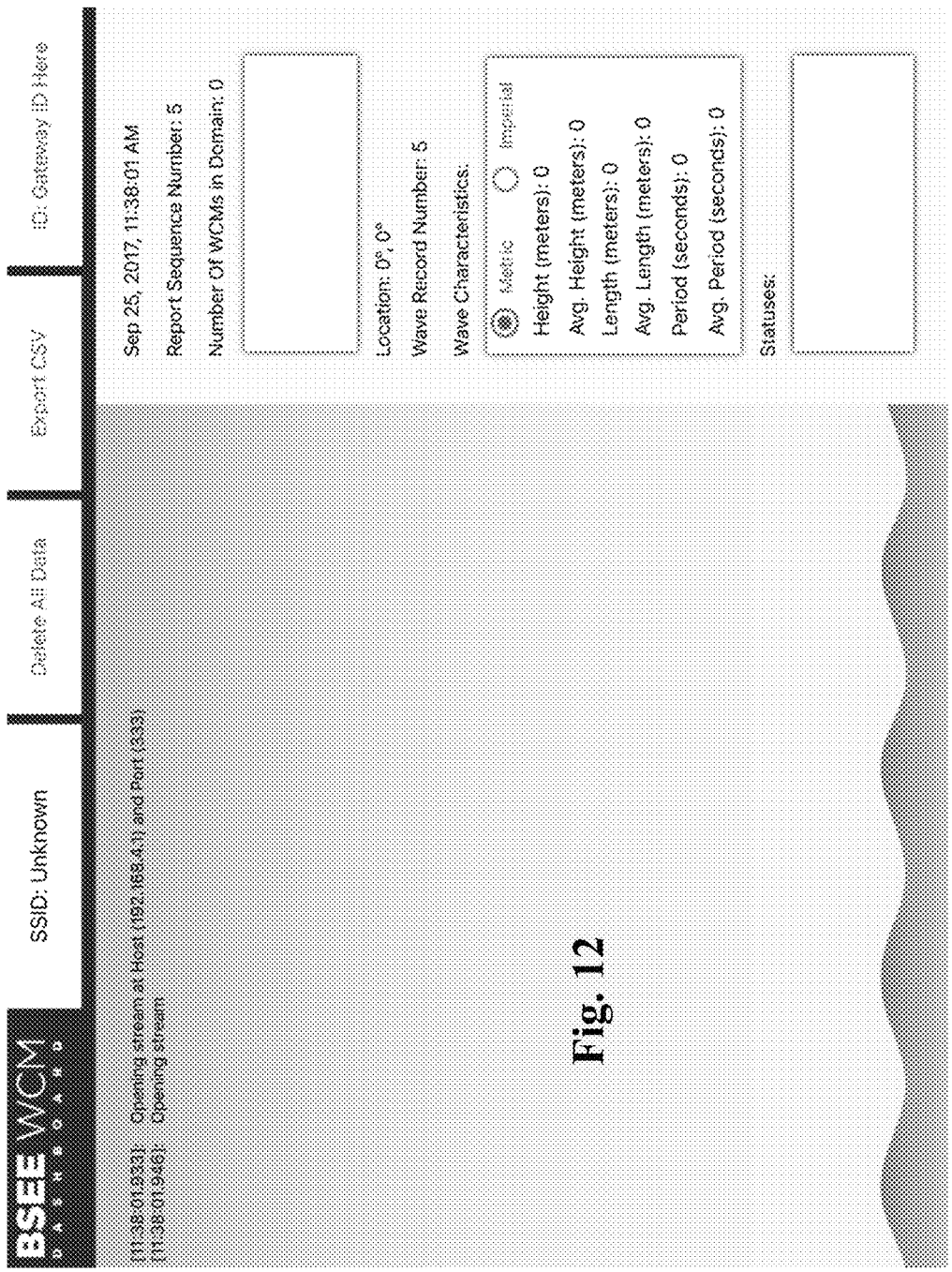
FIG. 12 depicts a tablet (iPad) application dashboard viewing a WCM gateway report.

FIG. 12 depicts a screenshot of an iOS application (app) that is designed to run on an iPad and ingest the same WCM gateway report and WCM node report messages as the GIS user interface for the user in a simple, easy-to-read dashboard. The app displays (1) which WCM Device a local user is connected to through the Wifi service set identifier (SSID), (2) the type of WCM Device (WCM, WCM-Sat, or WCM-Buoy), (3) which WCM Device/ID the local user is viewing and at what time, along with its status and wave characteristics; and (4) the WCM Devices in node mode that communicate through the mesh network to the Gateway WCM. Note that the SSID is automatically updated to the current device connected to, but that the ID panel in the top right corner needs to be selected to view the current gateway or other nodes that are available. All data are stored on the tablet locally until deleted and can be exported via email in a comma-separated values or other appropriate format. The iOS application was developed using the Swift programming language and standard APIs for connection and handling of data packets between the WCM Device's Wifi module and display on an iOS device. All the hardware required is built into the iPad tablet. The iPad needs to be preconfigured with the SSID and password before launching the application. Once the WCM Device, if in gateway mode, powers up its Wifi module, the iPad will automatically connect to the device. The iPad will create a socket at the specified Internet protocol (IP) and port number using the transmission control protocol/Internet protocol (TCP/IP) protocol to handshake with the WCM Device for data transfer and confirmation.

Testing has been performed on WCMs and WCM-Sats (which were mounted on a weir skimmer) along with a free-floating WCM-Buoy through various wave types and conditions, such as sinusoidal and harbor chop. Moreover, for testing, the aforesaid devices were sprayed with crude oil. In addition, the skimmer was towed through waves. Under all conditions, the system was able to operate and communicate data successfully. The accuracy of device measurements as to wave height throughout all wave types and testing conditions was within 4 in (0.1 m).

The following claims are thus to be understood to include what is specifically illustrated and described above, what is conceptually equivalent, what can be obviously substituted, and what incorporates the essential idea of the invention. Those skilled in the art will appreciate that various adaptations and modifications of the just described preferred embodiments could be configured without departing from the scope of the invention. The illustrated embodiments haven been set forth only for the purposes of example and that should not be taken as limiting the invention. Therefore, it is to be understood that, within the scope of the appended claims, the invention may be practiced other than as specifically described herein.

What is claimed is:

1. A geo-referencing Tag system for remote measuring and reporting of wave characteristics on a body of water comprising:
a plurality of data transmission tags, each data transmission tag comprising:
a wave characterization module comprising an accelerometer, the wave characterization module configured to generate wave characterization information;
a microcontroller; and
a communication module configured to communicate with a satellite tag and one or more data transmission tags,
wherein the data transmission tag is configured to be adjusted between a first mode and a second mode, the first mode causing the data transmission tag to aggregate wave characterization information received from one or more other data transmission tags, and the second mode causing the data transmission tag to provide wave characterization information to a different data transmission tag or the satellite tag; and
the satellite tag, wherein the satellite tag is for communicating with the plurality of data transmission tags and transmitting data generated by the data transmission tags to a Geographical Information System user interface via satellite, the satellite tag comprising:
a microcontroller;
a GPS receiver;
a satellite modem; and
a communication module for communicating with the plurality of data transmission tags wherein the satellite tag reports its GPS position and status details of the plurality of data transmission tags via the satellite modem and receives commands from the satellite modem.

2. The geo-referencing Tag system of claim 1, wherein the respective communication modules of the data transmission tags communicate with and are controlled by a local computing device without requiring input or output from the satellite tag.

3. The geo-referencing Tag system of claim 2, wherein the respective communication modules of the data transmission tags communicate locally by means of a wireless network without using mesh radio.

4. The geo-referencing Tag system of claim 1, wherein the wave characterization module further comprises a gyroscope.

5. The geo-referencing Tag system of claim 1, wherein the communication modules of the data transmission tags comprise radio frequency modules for establishing a mesh network between a group of the data transmission tags whereby any data transmission tag can wirelessly communicate with any other data transmission tag, and with the satellite tag.

6. The geo-referencing Tag system of claim 5, wherein the mesh network between data transmission tags is automatically formed and information is transmitted at regular intervals between data transmission tags and to the Geographical Information System user interface.

7. The geo-referencing Tag system of claim 1, wherein the satellite tag is configured to be adjusted between a first mode and a second mode, the first mode causing the satellite tag to report aggregated wave characterization information, and the second mode causing the satellite tag to provide wave characterization information to one of the data transmission tags or a different satellite tag, and wherein the satellite tag is in the first mode.

8. The geo-referencing Tag system of claim 1, wherein when a first data transmission tag of the plurality of data transmission tags is in the first mode, the first data transmission tag generates a wave characterization report based on aggregating wave characterization information received from one or more other data transmission tags.

9. The geo-referencing Tag system of claim 1, wherein when a first data transmission tag and a second data transmission tag of the plurality of data transmission tags are in the second mode, the first data transmission tag routes wave characterization information received from the second data transmission tag to a third data transmission tag of the plurality of data transmission tags which is in the first mode.

10. The geo-referencing Tag system of claim 1, wherein the microcontroller of the data transmission tag is configured to generate messages comprising wave characterization information for transmission via the communication module of the data transmission tag.

11. The geo-referencing Tag system of claim 1, wherein when a first data transmission tag of the plurality of data transmission tags is in the second mode, the first data transmission tag joins a mesh network associated with a second data transmission tag of the plurality of data transmission tags, wherein the second data transmission tag is in the first mode.

12. The geo-referencing Tag system of claim 1, wherein when a first data transmission tag of the plurality of data transmission tags is in the first mode, the first data transmission tag provides aggregated wave characterization information to the satellite tag.

13. The geo-referencing Tag system of claim 1, wherein for a first data transmission tag of the plurality of data transmission tags, the wave characterization information indicates heave associated with local wave conditions.

14. The geo-referencing Tag system of claim 1, wherein the satellite tag is configured to detect guided waves through ice.

15. The geo-referencing Tag system of claim 14, wherein the guided waves are generated by an acoustic transducer.

16. The geo-referencing Tag system of claim 1, wherein a first data transmission tag of the plurality of data transmission tags is attached to a piece of equipment configured to float on water.

17. The geo-referencing Tag system of claim 16, wherein the piece of equipment is associated with use of an oil skimmer.

18. The geo-referencing Tag system of claim 16, wherein the piece of equipment is an oil skimmer.

19. The geo-referencing Tag system of claim 1, wherein the Geographical Information System user interface forms part of a system for tagging and tracking assets.

20. The geo-referencing Tag system of claim 1, wherein the Geographical Information System user interface presents graphical representations of tagged assets, the tagged assets being associated with the plurality of data transmission tags.

21. The geo-referencing Tag system of claim 1, wherein the Geographical Information System user interface presents aggregated wave conditions.

* * * * *